US009210711B2

(12) United States Patent
Wiberg et al.

(10) Patent No.: US 9,210,711 B2
(45) Date of Patent: Dec. 8, 2015

(54) METHODS AND ARRANGEMENTS FOR ADAPTING RANDOM ACCESS ALLOCATION OF RESOURCES TO USER EQUIPMENTS

(75) Inventors: Niclas Wiberg, Linköping (SE); Erik Eriksson, Linköping (SE); Johan Rune, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 64 days.

(21) Appl. No.: 14/115,572

(22) PCT Filed: May 5, 2011

(86) PCT No.: PCT/SE2011/050561
§ 371 (c)(1),
(2), (4) Date: Nov. 4, 2013

(87) PCT Pub. No.: WO2012/150883
PCT Pub. Date: Nov. 8, 2012

(65) Prior Publication Data
US 2014/0079011 A1    Mar. 20, 2014

(51) Int. Cl.
*H04W 28/04* (2009.01)
*H04W 72/04* (2009.01)
*H04W 74/00* (2009.01)
*H04W 74/08* (2009.01)

(52) U.S. Cl.
CPC ........ *H04W 72/0486* (2013.01); *H04W 74/006* (2013.01); *H04W 74/0833* (2013.01)

(58) Field of Classification Search
CPC ..................... H04W 74/0833; H04W 72/0486
See application file for complete search history.

(56) References Cited

U.S. PATENT DOCUMENTS 8,090,382 B2 *   1/2012   Park et al. .................. 455/452.2
2012/0254890 A1 * 10/2012  Li et al. ......................... 719/313

FOREIGN PATENT DOCUMENTS

EP        1916863 A2    4/2008
WO     2007078165 A1    7/2007

OTHER PUBLICATIONS

3GPP TSG-RAN WWG2 Meeting #70bis, Jun. 28-Jul. 2, 2010, Stockholm, Sweden, Access procedure Enhancements for MTC applications, Entire document.*
Hossain et al. "Dynamic Assignment of Random Access Code Channels in WCDMA Networks." 2001 IEEE Global Telecommunications Conference. Nov. 25-29. San Antonio, Texas.
Amirijoo et al. "On Self-Optimization of the Random Access Procedure in 3G Long Term Evolution." Integrated Network Management-Workshops. Jun. 1, 2009. IEEE. Piscataway, NJ.

* cited by examiner

*Primary Examiner* — Maharishi Khirodhar
(74) *Attorney, Agent, or Firm* — Murphy, Bilak & Homiller, PLLC

(57) ABSTRACT

Devices and methods are provided for adapting the allocating of random access resources to user equipments of a cell served by a base station. A method in a base station where each RA preamble group maps or corresponds to an uplink allocation size comprises receiving a RA preamble from a UE in a cell served by the base station, the preamble indicating a requested resource allocation size for uplink transmission of UE data. Radio resource usage in the cell is monitored and a mapping between groups of RA preambles and uplink allocation sizes configured for the cell is adapted based on the monitored usage of radio resources. UEs or MTC devices are thus provided with an efficient means to have their UL allocation needs met for transmission of user data in conjunction with the Random Access procedure.

26 Claims, 5 Drawing Sheets

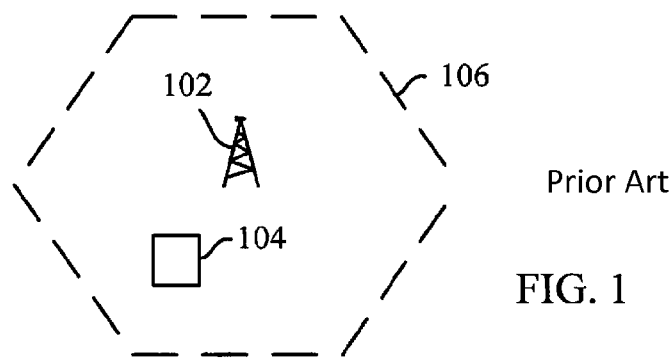
Prior Art
FIG. 1
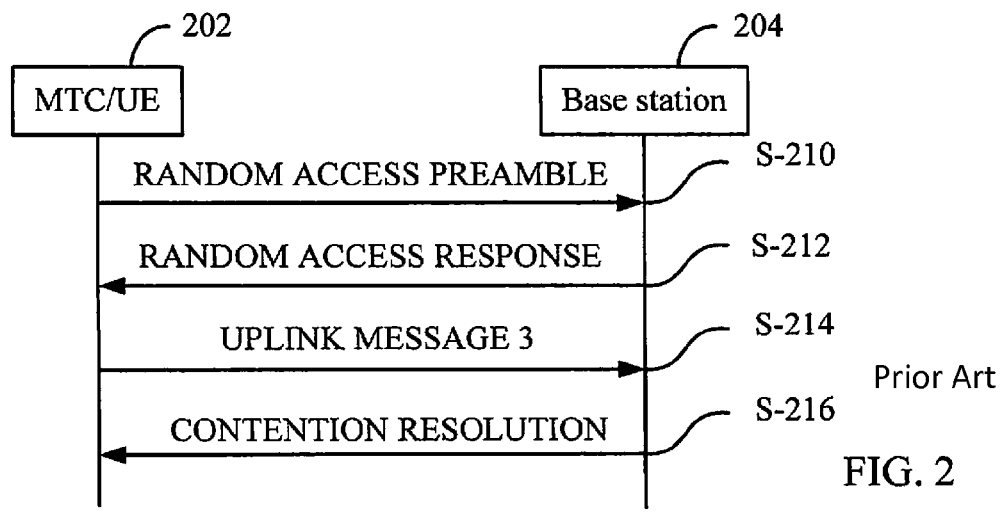
Prior Art
FIG. 2
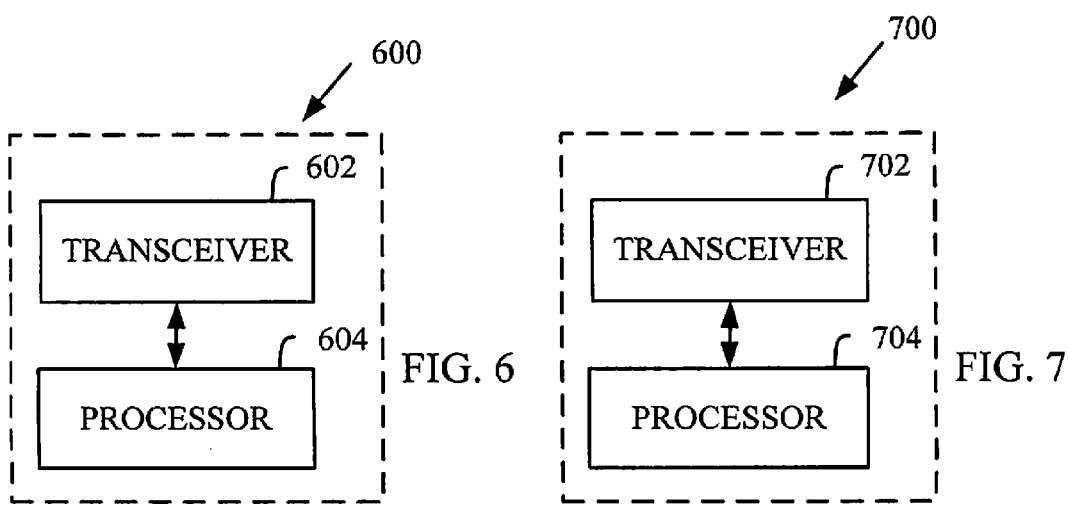
FIG. 6
FIG. 7

METHODS AND ARRANGEMENTS FOR ADAPTING RANDOM ACCESS ALLOCATION OF RESOURCES TO USER EQUIPMENTS

TECHNICAL FIELD

This disclosure pertains in general to the field of random access, and more particularly related to the field of random access allocation of resources to user equipments. The disclosure specifically relates to methods and arrangements for adapting random access resource allocations to user equipments.

BACKGROUND

A currently popular vision of the future development of the communication in cellular networks comprises large numbers of small autonomous devices, which typically transmit and receive only small amounts of data infrequently, for instance once per week to once per minute. These devices are generally assumed not to be associated with humans, but are rather sensors or actuators of different kinds, which communicate with application servers for the purpose of configuration of and data receipt from said autonomous devices within or outside the cellular network. Hence, this type of communication is often referred to as machine-to-machine (M2M) communication and the devices may be denoted Machine Devices (MDs). The nomenclature used in 3GPP ($3^{rd}$ Generation Partnership Project) standardization for the communication is Machine Type Communication (MTC), whereas the devices are denoted MTC devices.

With the nature of MTC devices and their assumed typical usage follow that they will often have to be very power efficient. This is due to that external power supplies will often not be available and due to that it is neither practically nor economically feasible to frequently replace batteries that are comprised within MTC devices.

As these devices are assumed to typically transmit rather seldom, their transmissions will in most cases be preceded by a Random Access (RA) procedure, which establishes the device's access to a network and reveals the device's identity to the network.

FIG. 1 schematically indicates a cellular network 106 that comprises a base station 102 and a Machine Type Communication (MTC) device or a User Equipment (UE) 104.

As an example, the Random Access procedure of a 3GPP Evolved Packet System (EPS) also known as a 3GPP Long Term Evolution/System Architecture Evolution (LTE/SAE) network is briefly described below.

There are two basic variants of the EPS Random Access procedure. One is the contention based RA procedure and the other is the non-contention based RA procedure.

The contention-based RA is schematically illustrated in FIG. 2. Random Access messages are communicated between the Machine Type Communication (MTC) device or User Equipment (UE) 202 and a base station 204. In the sequel, UE is used instead of MTC device. This is merely a matter of convenience and MTC device could just as well have been used throughout. The term UE should thus be interpreted as either an MTC device or any other type of UE.

In step S-210 the UE selects one RA preamble out of the available, typically 64, RA preambles. These 64 RA preambles are indicated in System Information (SI) that is broadcast by the base station in each cell. The RA preambles are divided into two subsets, subset A and subset B. The significance of the two subsets A and B is that they give a very coarse indication of the amount of data the UE would like to transmit in the subsequent step S-214. As there are only two subsets of preambles, the choice of preamble can only provide a binary data amount indication, such as A="small" and B="large".

It can be noted that there is a radio channel quality threshold that must be exceeded for a UE to be allowed to use a preamble from the subset indicating the larger data amount, B.

Further, in step S-210 the UE 202 transmits the selected RA preamble of the available RA preambles on the Random Access Channel (RACH).

Thereafter, the eNodeB 204 detects the reception of the transmitted preamble, as well as its timing, and transmits a Random Access Response (RAR) on the Downlink Shared Channel (DL-SCH) in step S-212. This RAR comprises an indication of the detected preamble, a timing advance command, a cell-unique temporary terminal identity being the Temporary Cell Radio Network Temporary Identifier (TC-RNTI) and an Uplink (UL) grant indicating the resources to be used for the UL transmission in step S-214. This transmission is indicated on the Physical Downlink Control Channel (PDCCH), addressed to the Random Access Radio Network Temporary Identity (RA-RNTI).

After receipt of the RAR message, the UE 202 identifies the indicated preamble in the RAR as the one that the UE transmitted in step S-210. In this way the UE can detect that this particular RAR message is intended for this specific UE. The UE can therefore conclude that the RAR is successful and transmits an Uplink message, Msg3 in step S-214.

If the UE 202 already had a Radio Resource Control (RRC) connection to the eNodeB 204, it uses this RA procedure to regain uplink synchronization. If the UE however does not have a connection to the eNodeB 204, the Uplink message, Msg3 includes one of the RRC messages: RRCConnectionRequest, that is transmitted on the Common Control Channel (CCCH) at initial access, RRCConnectionReestablishmentRequest, that is transmitted on the CCCH at RRC connection re-establishment and RRCConnectionReconfigurationComplete, that is transmitted on the Dedicated Control Channel (DCCH) after a handover into the cell. In all cases the UE 202 conveys an identity to the eNodeB 204.

After receipt of the Uplink message, Msg3, step S-214 the eNodeB 204 echoes the UE 202 identity in step S-216 in order to provide a final contention resolution. That is, in the case two UEs have transmitted the same preamble at the same access occasion, that is in step S-210 and they both tried to transmit at step S-214, then step S-216 indicates to the UEs, which UE's Msg3 the eNodeB received. Any contending UE whose identity was not echoed at step S-214 will back off and perform another attempt later. If the UE transmitted an RRC-ConnectionRequest message in step S-214, then step S-216 contains an RRCConnectionSetup message.

In the case of initial RRC connection establishment, that is if the UE 202 sent an RRCConnectionRequest message in step S-214 and the eNodeB 204 responded with an RRCConnectionSetup message in step S-216, then the 4 step RA procedure is followed by a RRCConnectionSetupComplete message from the UE, wherein the UE includes its first Network Access Stratum (NAS) message, for example an Attach Request or a Service Request message.

As indicated above it is important that the operation of the Machine Type Communication (MTC) devices is power efficient. For this reason, it has been discussed how to reduce overhead associated with infrequent transmissions of small data amounts. One of the targets of these discussions was the Random Access and bearer setup procedure, whose rather lengthy message exchange sequence represents a large overhead when only a small chunk of user data is to be transmitted.

Considering that the Random Access procedure has to be executed each time an MTC device that is lacking UL synchronization has UL data to transmit, this overhead will add up to substantial amounts. This would not only waste the battery power of MTC devices, but also waste system resources as well as reduce the general energy efficiency of the overall communication system.

An optimizing countermeasure that has been suggested is to transmit user data already in combination with step S-214 of the Random Access procedure, in Msg3. For such a scheme to be efficient the eNodeB needs a way to select a suitable size of the resources to be assigned in the UL grant for Msg3. A natural path to seek is then to find a means for the MTC device to indicate the size of the data to be transmitted to the eNodeB. Such a means in principle already exists in the current EPS specifications, in the form of two preamble groups, A and B, representing a regular and a larger message size.

According to the EPS specifications, a UE should select a preamble from group B if the data to be transmitted exceeds a certain size and the estimated channel quality exceeds a certain threshold. Otherwise the UE should select a preamble from group A.

It can be noted that the UE merely expresses a desired uplink data size for RA Msg3. The actually allocated uplink resource size is decided by the eNodeB. That is, the choice of preamble group represents a request that the eNodeB may or may not grant.

The available means for an MTC device and indeed for any UE to indicate its resource uplink data size that is required for a RA Uplink message, Msg3 is coarse since only two values can be indicated. It is also rigid, since it is statically determined, which is not suitable for efficient utilization of a scheme involving user data transmission in conjunction with step S-214 of the Random Access procedure. This rigidity results in poor matches between UL data to be sent and the sizes of the UL resources allocated for RA Uplink message, Msg3, which in turn results in poor resource utilization.

Furthermore, a consequence of this rigidity is that poor, or at least suboptimal correspondence between RA preamble groups and uplink resource allocation sizes may prevail, which impacts the collision probability negatively.

In an extreme case all UEs would seek to use a preamble from the same preamble group, which increases the collision probability, as the UEs contend using a smaller number of preambles.

SUMMARY

It is therefore an object to obviate at least one or some of the above disadvantages and provide an improved random access resource allocation procedure.

Accordingly, a method in a base station for adapting random access resource allocating to user equipments, UEs, of a cell served by the base station, is provided. The method comprises receiving a random access (RA) request comprising a RA preamble from a user equipment (UE), the preamble selected by the UE from a group of RA preambles associated with a RA resource allocation size, the UE thus requesting uplink (UL) radio resources. Availability of UL radio resources is then determined based on requested radio resources in the cell and based on the selected RA preamble of the RA request. A response is sent to the UE with a RA resource allocation dependent on said RA request and dependent on the determined availability of UL radio resources. A RA message, such as a RA Msg3, comprising UE data sent on the RA radio resource allocation is received from the UE. Radio resource usage in the cell is monitored and a mapping between groups of RA preambles and RA resource allocation sizes configured for the cell is adapted based on the monitored radio resource usage.

According to another aspect, the object is achieved with a method in a User Equipment (UE) for requesting a Random Access (RA) resource allocation for uplink data. The UE is comprised in a cell served by a base station and the method comprises receiving information of a mapping between groups of RA preambles and RA resource allocation sizes from the base station. The method also comprises adapting a random access configuration of the UE in accordance with the received information of the mapping between the groups of RA preambles and RA resource allocation sizes and estimating a required RA resource allocation size based on an amount of data to be transmitted in the uplink by the UE. The UE determines, based on the received mapping information, a RA preamble group associated with a RA resource allocation size, where the RA resource allocation size is equal to or exceeds the estimated required resource allocation size by a margin. The UE then selects a RA preamble from the determined RA preamble group to be sent as a RA request to the base station, wherein the RA preamble indicates a required amount of RA resources to be allocated to the UE for transmitting the amount of UL data.

According to another aspect, the object is achieved with a base station for adapting random access resource allocating to user equipments, UEs, comprised in a cell served by said base station. The base station comprises transceiver circuitry configured to receive a random access (RA) request from a UE. The request comprises a RA preamble selected by the UE from a group of RA preambles associated with a RA resource allocation size, the UE thereby requesting uplink (UL) radio resources. The base station further comprises processor circuitry connected to the transceiver circuitry, wherein the processor circuitry and transceiver circuitry are configured to:
   determine availability of UL radio resources based on requested resources in the cell and based on the selected RA preamble of the RA request;
   respond to the UE with an UL RA resource allocation dependent on the RA request and dependent on the determined availability of UL radio resources;
   receive, from the UE, a RA message comprising UE data sent on the allocated UL RA resource;
   monitor radio resource usage in the cell, and
   configured to adapt, based on the monitored radio resource usage, a mapping between groups of RA preambles and RA resource allocation sizes configured for the cell.

According to yet another aspect, the object is achieved with a UE configured for requesting a Random Access (RA) resource allocation for uplink data, wherein the UE is comprised in a cell served by a base station. The UE comprises a transceiver configured to receive information of a mapping between groups of RA preambles and RA resource allocation sizes from the base station. The UE also comprises a processor operatively connected to the transceiver, wherein the processor is configured to adapt a random access configuration of the UE in accordance with the received information of the mapping between the groups of RA preambles and RA resource allocation sizes, to estimate a required RA resource allocation size based on an amount of data to be transmitted in the uplink by the UE, and configured to determine, based on the received mapping information, a RA preamble group associated with a RA resource allocation size, where the RA resource allocation size is equal to or exceeds the estimated required resource allocation size by a margin. The processor is further configured to select a RA preamble from the determined RA preamble group to be sent as a RA request to the base station, wherein the RA preamble indicates a required amount of RA resources to be allocated to the UE for transmitting the amount of UL data.

The following advantages are provided by embodiments of the present disclosure: UEs or MTC devices are provided with an efficient means to signal their UL allocation needs for transmission of user data in conjunction with step 3 of the Random Access procedure.

Embodiments provide UEs or MTC devices with an appropriate UL resource allocation for Random Access step 3, thereby being able to transmit queued data, while retaining good radio resource utilization.

Another advantage is that an increased UL allocation size granularity is provided.

Also, less battery power is consumed in UEs or MTC devices according to embodiments of the present disclosure.

It is also advantageous that less radio resources are used in a cell with UEs and MTC devices according to embodiments of the present disclosure.

Another advantage with embodiments of the present disclosure is that the Random Access preamble collision risk is either reduced or at least maintained, that is, it is at least not increased.

A further advantage is that system efficiency can be maintained high due to ability to adapt to changing conditions.

BRIEF DESCRIPTION OF DRAWINGS

These and other aspects, features and advantages which the invention provides, will be apparent and elucidated from the following description of embodiments of the present disclosure, reference being made to the accompanying drawings, in which FIG. 1 schematically indicates a cellular network;

FIG. 2 schematically illustrates the contention based Random Access procedure in Evolved Packet System (EPS);

ABBREVIATIONS

3GPP $3^{rd}$ Generation Partnership Project
BSR Buffer Status Report
CCCH Common Control Channel
C-RNTI Cell Radio Network Temporary Identifier
DCCH Dedicated Control Channel
DL-SCH Downlink Shared Channel
EPS Evolved Packet System
LTE Long Term Evolution
M2M Machine to machine
MAC Medium Access Control
MD Machine Device
MTC Machine Type Communication
Msg3 Message 3
NAS Network Access Stratum
PDCCH Physical Downlink Control Channel
PLMN Public Land Mobile Network
RA Random Access
RACH Random Access Channel
RAR Random Access Response
RA-RNTI Random Access Radio Network Temporary Identifier
RNTI Radio Network Temporary Identifier
RRC Radio Resource Control
SAE System Architecture Evolution
SI System Information
SON Self-Organizing Network
S-TMSI S-Temporary Mobile Subscriber Identity
TC-RNTI Temporary Cell Radio Network Temporary Identifier
UE User Equipment
UL Uplink

DETAILED DESCRIPTION OF THE EMBODIMENTS

The general object or idea of embodiments of the present disclosure is to address at least one or some of the disadvantages with the prior art solutions described above as well as below. As mentioned above, the available means for an MTC device and indeed for any UEs to indicate its resource allocation needs for a Random Access (RA) Uplink message, such as Msg3, is coarse and rigid, and thus not suitable for efficient utilization of a scheme involving user data transmission in conjunction with Uplink message 3 of the Random Access procedure. This rigidity results in poor correspondence between UL data to be sent and the sizes or amounts of UL resources allocated for RA Uplink messages, such as RA Msg3, which in turn results in poor resource utilization.

Embodiments of the present disclosure address the described coarseness of the prior art and provides means to reduce at least one or some of these disadvantages. This is for example dealt with by providing an extension of the two preamble groups A and B to a greater, and in the context of this disclosure, arbitrary, number of preamble groups, for example A, B, C, D, . . . , where each preamble group maps or corresponds to a certain RA uplink resource allocation size, for RA Message 3.

As with the prior art preamble groups of Evolved Packet System (EPS), a preamble from a certain preamble group can be considered to represent a request for a certain Uplink resource allocation size. However, as will be discussed down below, the eNodeB may or may not choose to grant the request. The resource size that the eNodeB allocates for the uplink may thus differ from the uplink resource allocation size to which the group of the preamble corresponds or maps. As will further become clear in paragraphs below embodiments of the presents disclosure address the rigidity of the prior art and provide a mechanism for adapting random access resource allocations to user equipments of a cell to better cater for different requirements of the UEs.

Figure 3A:
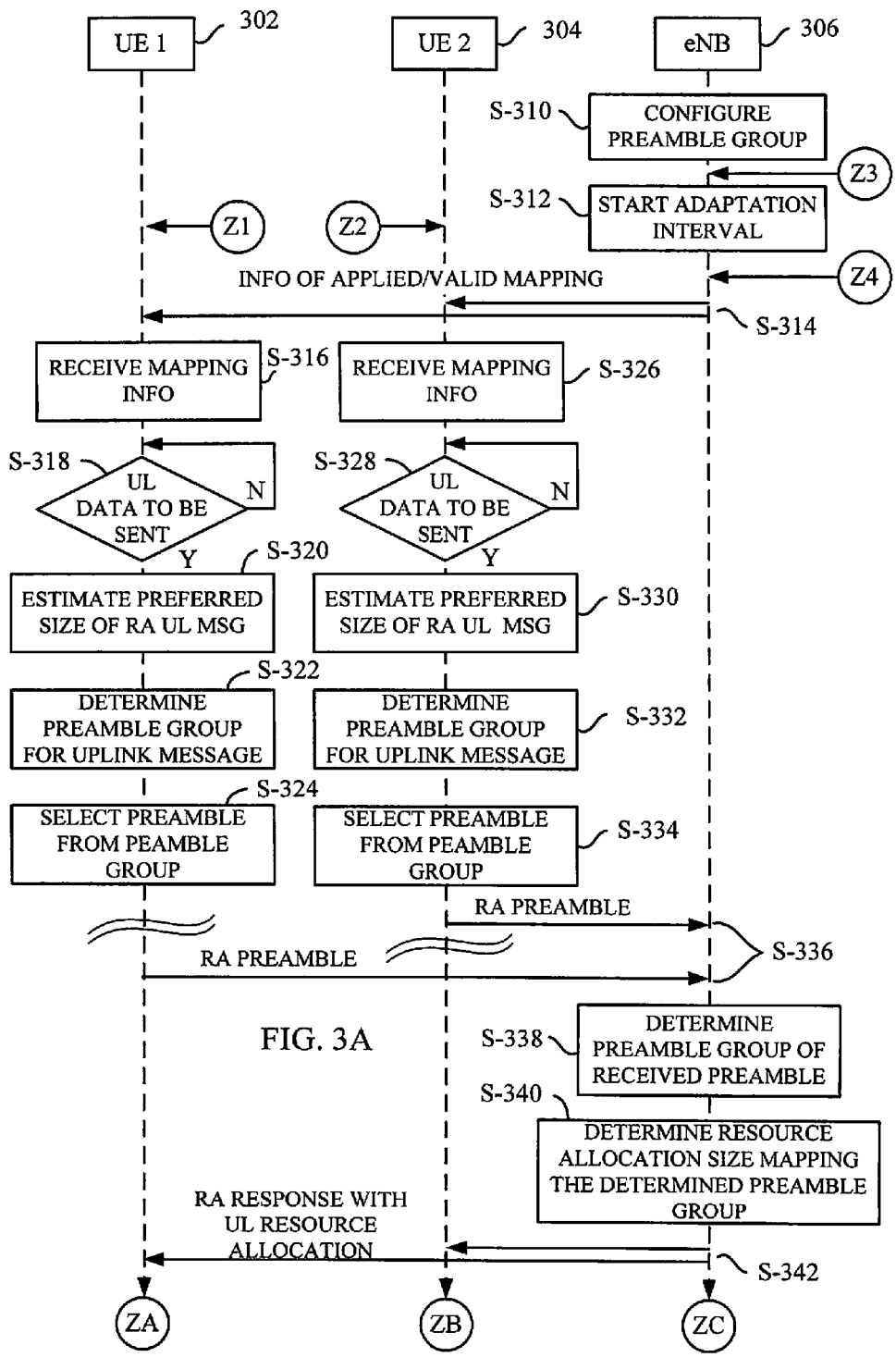
FIGS. 3A and 3B illustrate a signal-type diagram related to embodiments of the present disclosure.
Figure 3B:
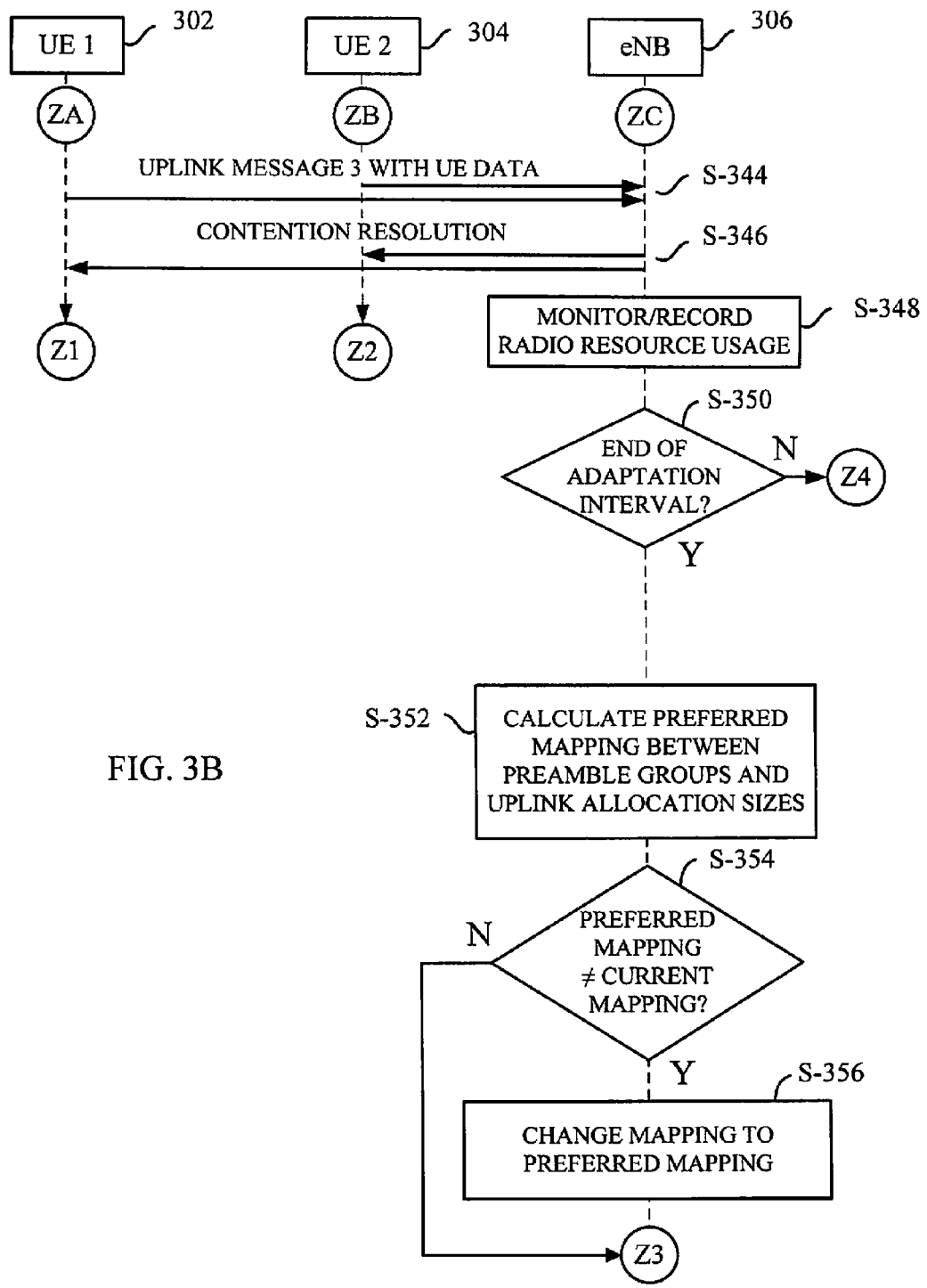

A Random Access, RA, resource is the radio resources, such as the radio resource blocks, used for transmission of any one or all of the 4 messages constituting the RA procedure, for example the random access procedure shown in or being part of any one or more of FIGS. 2, 3A and 3B. In an LTE system, an uplink resource block is a time-frequency resource consisting of resource elements in the form of 12 subcarriers of 15 kHz each in the frequency domain and a number of OFDM symbols, such as DFTS-OFDM symbols, of one slot of 0, 5 ms length in the time domain, where two slots equals one subframe of 1 ms. In a wider sense a Random Access preamble (such as one sent by the UE in the first message of the LTE Random Access procedure) can also be seen as a Random Access resource.

It is noted that with the extension of the number of preamble groups, the need for a mechanism for flexible adaptation of the mapping or correspondence between the RA preamble groups and uplink random access resource allocation sizes, may increase even further.

A random access resource allocation size, in the context of the disclosed embodiments of the present disclosure, corresponds to an amount of radio resources or a number of radio resource blocks allocated for random access transmission of uplink data.

An important consideration of the embodiments of the present disclosure is the preamble collision probability when multiple UEs attempt to perform RA at the same RA occasion. On the one hand, as mentioned above, a poor mapping between RA preamble groups and RA resource allocation sizes for uplink transmission of data may easily result in an increased collision probability, as UEs may have to contend for using a reduced number of preambles in each group. On the other hand, an ideal, or at least very well adapted mapping between RA preamble groups and uplink RA resource allocation sizes may in fact decrease the collision probability. For instance, in the utopian mapping scenario wherein simultaneously accessing UEs are distributed so that there is only one UE in each preamble group, that is wherein only one UE selects a preamble from each preamble group, the resulting collision probability will become zero, for obvious reasons.

Therefore, the importance of providing a mechanism for an efficient and dynamically adaptable mapping, i.e. correspondence, between RA preamble groups and uplink RA resource allocation sizes is emphasized. It can further be concluded that the distribution of the RA preambles to the different preamble groups should ideally match the distribution of the desired uplink RA resource allocation sizes for the UEs.

For this reason it is herein proposed eNodeB base station based embodiments to over time adapt a mapping between groups of RA preambles and UL RA allocation sizes.

Below, in FIGS. 3A and 3B a signal-type diagram of a Random Access procedure utilizing adaptation of a mapping, i.e. correspondence, between RA preamble groups and uplink RA resource allocation sizes, is schematically illustrated. These figures are presented in order to present embodiments of the present disclosure in the right context.

FIGS. 3A and 3B disclose a signal-type diagram involving a first UE 302 herein denoted UE1, and a second UE 304 herein denoted UE2, on the one hand, and an eNodeB base station 306 on the other hand. It should be mentioned that UE1 and UE2 are merely two examples of a potentially large number of UEs in a cell served by the eNodeB base station 306. In this respect, the two UEs are considered to represent a large number of UEs.

FIGS. 3A and 3B provide an understanding as well as an implementation of an inventive concept of embodiments, in a somewhat larger context. FIGS. 3A and 3B illustrate an example of the first two steps, step A and step B of the Random Access procedure. The signaling-type diagram of FIG. 3A commences by the eNodeB 306 being configured with a mapping between RA preamble groups and uplink resource allocation sizes according to initial or default mapping or correspondence values, in step S-310.

The eNodeB may then start an adaptation time interval in step S-312. In short, the adaptation time interval is the time duration between two consecutive adaptations of the mapping or correspondence between RA preamble groups and uplink resource allocation sizes. Alternative ways of commencing the adaptation time interval as well as further aspects of the adaptation time interval will be presented down below. In step S-314 the eNodeB broadcasts information of a valid or currently applied mapping or correspondence between RA preamble groups and uplink resource allocation sizes to the UEs. This information is typically sent as comprised in the System Information (SI) message.

In step S-316, the UE1 302 obtains information of the applied or valid mapping and adapts a RA configuration according to the received mapping information.

In step S-318, the UE1 302 then determines whether there is data to be sent on the UL, or not. If there is no data, the UE1 302 again executes step S-318. If there is data, UE1 302 estimates the preferred or required uplink data size for RA Message 3, step S-320. Having estimated the uplink data size, the UE1 302 then determines the preamble group that corresponds or maps to an uplink resource allocation size that is equal to or exceeds the estimated preferred uplink resource allocation size by the least margin of the available preamble groups in step S-322. It is thus determined which preamble group corresponds to an uplink resource allocation size that is equal to, or slightly larger than, the preferred or required uplink data size from step S-320. In step S-324, the UE1 302 then selects a preamble from the determined preamble group. It can be added that this preamble is arbitrarily, preferably randomly, selected from the determined RA preamble group.

For clarity it can be mentioned that each UE typically determines whether, or not, there is data to be sent on the UL. Therefore each UE will subsequently independently send a RA preamble to the eNodeB base station 306.

As mentioned above UE2 304 has been added to illustrate that each UE of a large number of UEs can send a RA preamble to the eNodeB 306.

Accordingly, since steps S-326-S-334 of UE2 304 correspond to steps S-316 S-324 of UE1 302, reference is made to the aforementioned steps with the appropriate amendments.

In step S-336, the eNodeB receives a respective RA preamble from each of UE1 302 and UE2 304. Again, each RA preamble can thus be received independently by the eNodeB 306.

In step S-338, the eNodeB 306 determines to which preamble group the received preamble belongs. In step S-340 the eNodeB 306 determines the Uplink resource allocation size that maps, i.e. corresponds, to the determined preamble group.

In step S-342, the eNodeB 306 sends a RA response with the determined UL resource allocation size to the respective UE. Each RA response comprises one of the RA preambles that were received by the eNodeB 306 in step S-336. Note that an eNodeB may send several RA responses combined in a single Medium Access Control (MAC) message, wherein each RA response in the message is intended for a different UE. Based on the particular RA preamble, as comprised in the RA response, each UE can determine whether the RA response is addressed to itself or another UE that made a connection attempt by sending a RA preamble in step S-336.

It is again mentioned that the request for uplink data allocation size is merely a request and can be overruled by the eNodeB 306.

The signaling-type diagram is now continued in FIG. 3B. Having received a RA response, corresponding to step B, i.e. step S-212 of FIG. 2, of the Random Access procedure, the UE1 302 and UE2 304 can each send an Uplink message 3 with UE data to the eNodeB, in step S-344. The UEs hereby use the Uplink allocation size as communicated in the RA response in step S-342. Thereafter, the eNodeB can send a contention resolution message to each UE, step S-346.

In step S-348, the eNodeB 306 monitors and/or records radio resource usage in the cell such as data related to input from the UEs and frequency of usage of the different preamble groups. It should be mentioned that step S-348 may in some embodiments be performed before step S-346.

Moreover, the data related to input from the UEs typically comprises at least one of: preamble group usage, the sizes of uplink RA message 3, and buffer status reports from UEs. The preamble group usage can relate to the number of usages, the frequency of usages or both the number and frequency of usages.

In step S-350, the eNodeB determines whether or not end of adaptation interval is detected, for example by checking an adaptation interval timer. It is thus determined whether or not the mapping between the RA preamble groups and the uplink resource allocation sizes is to be evaluated.

If the end of the adaptation interval is not detected in step S-350, the following step is step S-314 of broadcasting information about the valid or currently applied mapping to the UEs, as illustrated in FIG. 3A.

If the end of adaptation time interval is detected in step S-350, the eNodeB 306 determines, e.g. calculates, a preferred mapping between RA preamble groups and uplink resource allocation sizes in step S-352. One or more mapping configurations are then for example calculated, of which one is considered to be the preferred configuration. Whether or not it is preferred may depend on a number of parameters, which will be discussed in some details in paragraphs to come down below.

In step S-354 the eNodeB 306 determines whether the preferred mapping, as calculated in step S-354 is different from the mapping that is currently applied or set.

If the preferred mapping differs or differs beyond or above a threshold margin from the currently applied mapping, as determined in step S-354, the following step is step S-356 of changing the current mapping to the preferred mapping, i.e. setting the mapping of the eNodeB 306 to the preferred mapping.

If, however, it is determined that the preferred mapping is not different or only differs within or below a threshold margin from the current mapping in step S-354, the currently applied mapping configuration of RA preamble groups to UL resource allocation size is kept unchanged. That is the currently applied or set random access configuration is maintained.

After step S-356 in the case the mapping was changed or after step S-354 in the case the preferred mapping was not different or only differs within or below the threshold margin from the current mapping, next step is step S-312 of re-starting an adaptation timer interval.

An example of an implementation of the inventive concept of embodiments of the present disclosure has thus been discussed. In the following, further embodiments of the present disclosure will be described.

Figure 4:
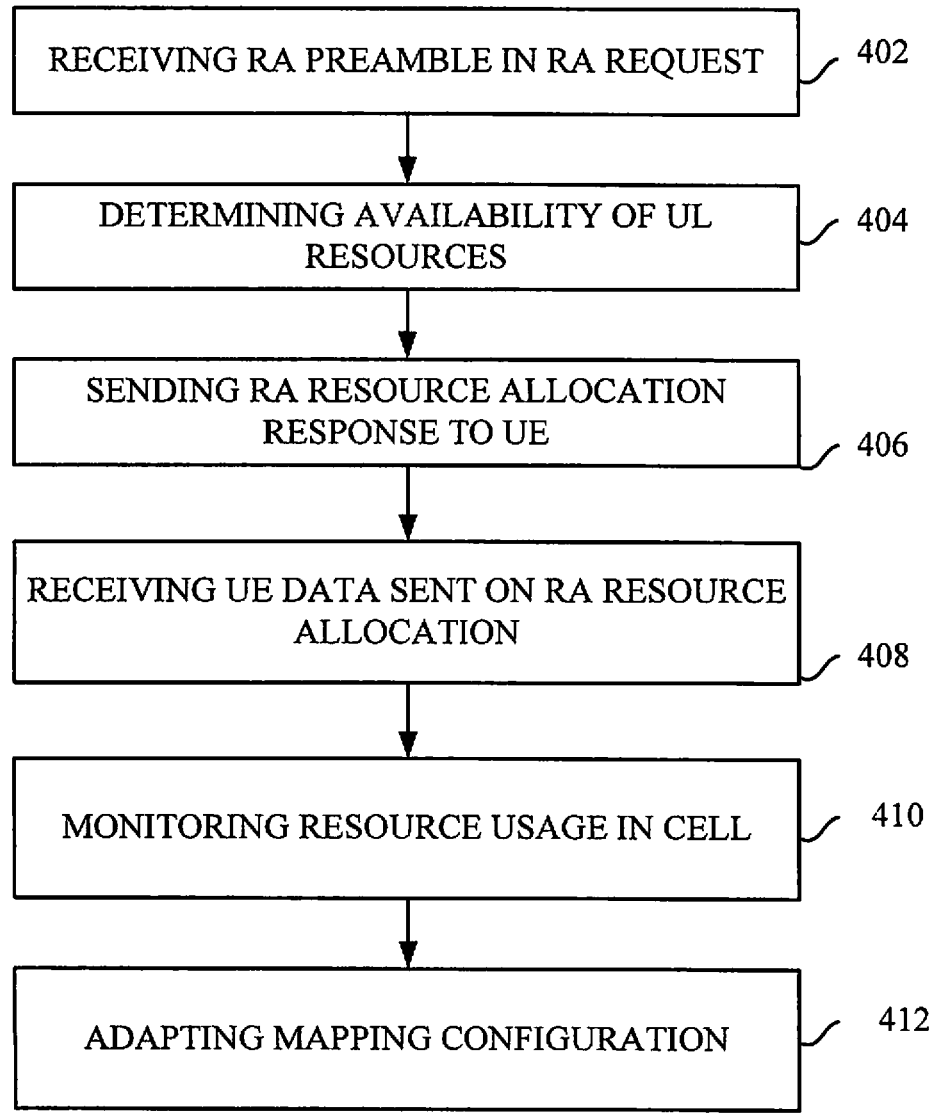
FIGS. 4-5 illustrate flow-charts of method steps according to embodiments of the present disclosure, and FIGS. 6 and 7 schematically illustrate radio network nodes according to embodiments of the present disclosure.

FIG. 4 presents a flowchart of method steps 402-412 of a general method for use in an eNodeB base station for adapting allocating of random access resources to user equipments, UEs, of a cell served by the eNodeB, according to embodiments of the present disclosure.

Step 402

The eNodeB receives a random access, RA, request comprising a RA preamble from a UE, such as an MTC device, in the cell sent on the random access channel (RACH). The RA preamble of the RA request has been selected by the UE from a group of RA preambles associated with a certain RA resource allocation size. Through selecting a preamble of a certain preamble group, the UE is requesting a certain amount of uplink, UL, radio resources corresponding to the associated allocation size. A default or initial preamble group to resource allocation size mapping may be configured in the eNodeB as part of a random access configuration of the eNodeB or values for setting or modifying such configuration may be signaled from another network node, such as a core network node, controller node, an operation and maintenance (O&M) node or the like. The same preamble group to resource allocation size mapping information and/or corresponding RA configuration is made known to the UEs of the cell, for example though broadcast signaling such information included in system information (SI) messages.

Step 404

The eNodeB determines availability of UL radio resources based on requested radio resources in the cell and based on the selected RA preamble in the RA request from the UE. The eNodeB here takes account of all resources being requested in the cell as well as those requested by the UE, indicated with the selected preamble. This determination of availability may be performed by the eNodeB scheduler or the eNodeB entity for admission control by concurrently evaluating the resource needs of the UEs of the cell by comparing the concurrently requested and reserved UL resources in the cell with the radio resource blocks available for uplink data.

Step 406

Dependent on the determined availability of UL radio resources at the time of the RA request and dependent on the selected preamble of the request, the eNodeB then sends a RA response message to the UE with a RA resource allocation for uplink transmission of data. The granted resource allocation may then be matching the requested size if enough RA radio resources are found available or not matching the size, i.e. being of a smaller size than requested, if there are not enough available resources.

Step 408

The eNodeB then receives a RA message, such as a random access message 3, comprising UE data, such as user data payload, sent on the granted uplink RA radio resources from the UE.

Step 410

Radio resource usage in the cell is monitored and/or recorded by the eNodeB either continuously or at certain intervals, for example with an interval matching a mapping adaptation interval.

Radio resource usage in the cell may in embodiments comprise monitoring one or more of: a frequency of usage of one or more RA preamble groups, an amount of uplink UE data received in RA messages, and an amount of UE data waiting to be transmitted uplink by one or more UEs.

A radio resource usage monitoring sequence may be configured in the eNodeB base station by setting monitoring interval parameters determining a frequency and length of a monitoring interval and by setting or configuring which of the above listed radio resource usage parameters should be included in a monitoring sequence. Such a monitoring configuration may be preset in the eNodeB or may be set or adapted dynamically e.g. by signaling from a core network node, a controller node or an O&M node.

The radio resource usage parameter relating to the amount of uplink UE data waiting to be transmitted by one or more UEs in the cell may be monitored by the eNodeB through looking at Buffer Status Reports (BSRs) received from said one or more UEs.

In some embodiments a usage of preambles from the different RA preamble groups are calculated during a mapping adaptation time period or interval and the frequency or amount of usage of the different RA preamble groups are compared for determining how to adapt the mapping of RA preamble groups to RA resource allocation sizes to cater for requested RA radio resources in the cell.

Step 412

The mapping of groups of RA preambles to RA resource allocation sizes configured in the eNodeB for the cell is then adapted or changed based on the monitored radio resource usage. The eNodeB may then, in some embodiments, inform the UEs of the cell of said adapted mapping between groups of RA preambles and RA resource allocation sizes by broadcasting the information about the adapted mapping in system information (SI) messages to the UEs in the cell.

The mapping of groups of RA preambles to RA resource allocation sizes may in some embodiments be adapted by one or more of:
 i. changing the RA resource allocation size that at least one of the RA preamble groups is associated with; and
 ii. changing the number of RA preambles that is associated with at least one of the groups of RA preambles, and
 iii. changing the priority level of at least one RA preamble group of the number of RA preamble groups.

Some embodiments may comprise that one or more parameter values of the mapping of groups of RA preambles to RA resource allocation sizes are configured, e.g. as part of a RA configuration, in the eNodeB base station for the cell such that the adapting of the mapping comprises changing at least one of the one or more mapping parameter values. The one or more mapping parameter values may then comprise one or more of: a number of groups of RA preambles defined for the cell, a number of RA preambles defined for each RA preamble group of the number of groups, a priority level defined for each RA preamble group of the number of RA preamble groups and a defined size of a RA resource allocation associated with each RA preamble group of the number of RA preamble groups.

The adapted mapping for one or more RA preamble groups may be configured to be applied or valid for a set time period or interval during which time period or interval no further adaptations of the mapping will be performed. A subsequent adapting of a mapping for the one or more RA preamble groups may then only be performed and/or applied after the expiry of said time period or interval.

In some embodiments, the adapting of a mapping comprises calculating the adapted mapping between said groups of RA preambles and resource allocation sizes such that at least one group of RA preambles have higher probability for collision than at least one other group of RA preambles of said groups of RA preambles in said cell, wherein a collision comprises that two UEs attempts to transmit the same RA preamble on the same random access resource. Any one or combination of more than one of the below described algorithms may then be used for calculating the adapted mapping of groups of RA preambles to resource allocation sizes.

It can be added that the eNodeB may be configured to continuously monitor or track the actual resource allocation needs or resource usage in the form of received RA preambles transmitted from the UEs in its served cell(s). This may be complemented by, or replaced by, information from Buffer Status Reports (BSR) from UEs and/or information about volumes of actually transmitted Uplink data, preferably provided by RA Msg3 messages themselves, i.e., through the formats and/or sizes of the received RA Msg3 messages.

According to some embodiments of the present disclosure, the methods are preferably executed separately for each cell. However, performing the adaptations over larger entities, such as all cells belonging to an eNodeB or all cells in a Tracking Area or even all cells in the entire Public Land Mobile Network (PLMN) is also conceivable. Although all these variants are possible, it is henceforth assumed that the method for adapting a mapping or correspondence between RA preamble groups and uplink RA resource allocation sizes is used per cell.

Moreover, based on the above described UE data the eNodeB may periodically adapt the mapping between RA preamble groups and uplink resource allocation sizes to better match the recorded input data. The eNodeB may achieve this either by changing the number of preambles in each preamble group and/or by changing the uplink resource allocation sizes that the different RA preamble groups correspond/map to. Changing the number of preamble groups is also an option.

An alternative embodiment of a method in a base station for adapting the allocating of random access resources to user equipments of a served cell is provided where the base station comprises a random access configuration in which random access preamble groups are configured to map or correspond to respective uplink resource allocation sizes. The method comprises receiving a random access preamble from a UE in the cell, the preamble indicating a requested resource allocation size for uplink transmission of UE data. Radio resource usage in the cell is monitored and the mapping between groups of RA preambles and uplink allocation sizes configured for the cell is adapted based on the monitored usage of radio resources. UEs or MTC devices are thus provided with an efficient means to have their UL allocation needs for transmission of user data in conjunction with step 3 of the Random Access procedure met.

Figure 5:
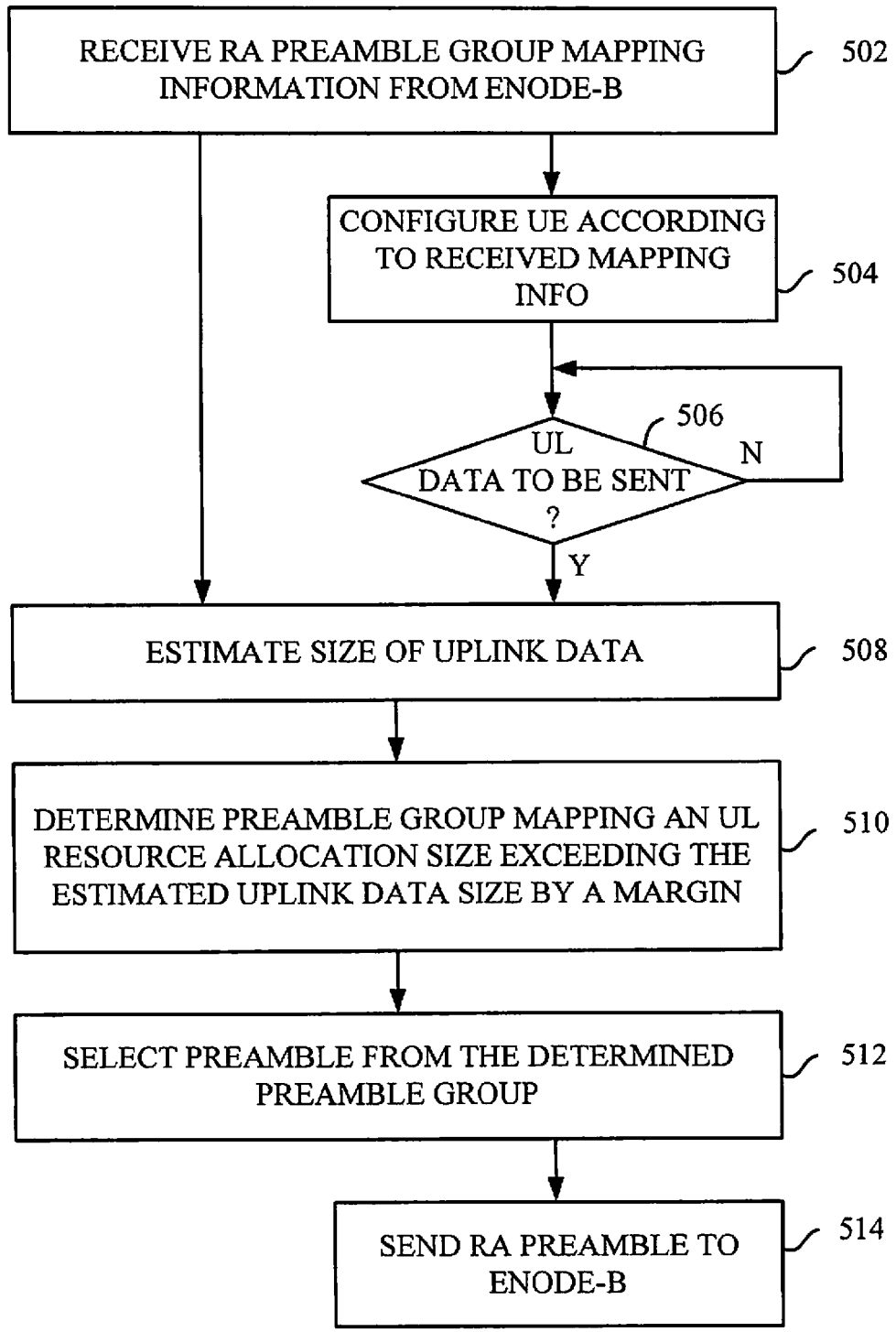

Having discussed implications on the eNodeB of embodiments of the present disclosure, implications on the UEs will now be presented. FIG. 5 presents a flow-chart of method steps in a Machine Type Communication device or a UE for requesting a RA resource allocation for transmitting UL data wherein a mapping between RA preamble groups and uplink resource allocation sizes is adapted for improving the allocation of RA resources for uplink transmission of UE data. It should be pointed out that FIG. 5 presents two embodiments in one figure. A general embodiment comprising steps 502, 508, 510 and 512, as well as a more specific embodiment that in addition comprises steps 504, 506 and 514, will be discussed.

In the following the term UE will be used instead of MTC or UE, where MTC is an example UE device that could substitute UE in the following. In step 502, the UE receives information on a mapping or correspondence between RA preamble groups and uplink resource allocation sizes from an eNodeB for example transmitted in broadcast signaling of system information (SI). In step 504, the UE adapts or sets a random access configuration according to the received RA preamble group to uplink resource allocation size mapping. In step 506 the UE determines whether there is uplink data to be sent to the eNodeB or not.

When there is uplink data to be sent, the UE estimates a preferred or required resource allocation size for the uplink data in step 508. In this step the required resource allocation size equals the amount of data to be transmitted UL. The UE then determines a RA preamble group that corresponds or maps to an uplink resource allocation size that is equal to or exceeds the uplink data size by a margin, which in some embodiments may be the least margin of the resource allocation sizes corresponding to RA preamble groups, in step 510. For example a RA preamble group is determined which maps or corresponds to an uplink resource allocation size that exceeds the uplink data size by a margin close to zero or by the smallest margin, following the mapping or correspondence between RA preamble groups and uplink resource allocation sizes. In step 512 the UE then selects a RA preamble out of the determined RA preamble group. Subsequently, the UE may transmit the RA preamble to the eNodeB in step 514 as a RA request.

As mentioned above, the signal-type diagram of FIGS. 3A and 3B illustrate an example related to embodiments of the present invention. It is noted that setting the adaptation interval or time period to a zero or a small value, in principle eliminates the condition step, step S-350 of detecting end of adaptation time interval. As this would mean that the end in practice always would be detected, the condition step S-350 would simply be short-circuited. In this way, this example also comprises an embodiment with no adaptation interval, but with essentially continuous adapting of the mapping.

It should also be mentioned that the kind of asynchronous processes that FIGS. 3A and 3B operation are examples of are difficult to appropriately illustrate with a signal-type diagram. This makes compromises in the illustration almost inevitable. For instance, in a real implementation the adaptation interval would probably be controlled by a timer, whose expiration would trigger the re-evaluation or recalculation of the RA preamble group to uplink resource allocation size mapping. This timer could expire at any time and its expiration may be difficult to fit into a sequential flow chart in any consistent manner. As a compromise in the signal-type diagram the expiration of the adaptation interval is checked as a part of an endless loop where Random Access processing, statistics monitoring and/or recording and checking of adaptation interval expiration, followed by recalculation of the RA preamble group to uplink resource allocation size mapping in case the adaptation interval has expired, occur sequentially.

As indicated previously, Machine Type Communication (MTC) devices with "chatty" traffic behavior that is characterized by small, more or less infrequent data transactions can be considered to be the primary target of some embodiments of the present disclosure. A cellular system may be designed to let only such MTC devices transfer user data in conjunction with RA step 3 and in such a system only such MTC devices would benefit from the more fine-granular RA preamble group to uplink resource allocation size mapping or correspondence provided by the additional RA preamble groups.

However, usage of embodiments of the present disclosure does not have to be restricted to MTC devices. In principle any UE may benefit from the general idea of the disclosure embodiments. Also, the network may benefit from having any UE use it.

In addition, also regular UEs engaging in web browsing, will occasionally or even frequently, send small amounts of data, for instance, when establishing a TCP connection. Even if this initial small amount of data is followed by larger amounts, it may be beneficial to send the initial small data chunk in conjunction with RA message 3, while establishing a regular bearer, for instance an EPS bearer in 3GPP EPS, for the transfer of subsequent data.

FIG. 6 schematically illustrates an example radio network node 600, such as a radio base station (RBS), configured for implementing herein described embodiments of a method for use in a base station, such as the RBS method embodiments described in relation to FIG. 3A, 3B and FIG. 4. The RBS 600 to this end comprises processor 602 and transceiver 604 circuitry operatively connected and configured for performing the method steps of any one or more of the herein described RBS embodiments.

The RBS may further also have a memory (not shown) connected to said processor circuitry 602 for storing one or more parameter values of a mapping between groups of RA preambles and RA resource allocation sizes being defined for the cell. An adapting of the mapping then comprises changing at least one of the stored one or more mapping parameter values. The RBS may also comprise a scheduler (not shown) configured for scheduling resource allocations for uplink transmission of data from UEs of one or more cells that the RBS is serving.

FIG. 7 in turn schematically illustrates an example radio network node 700, such as a user equipment (UE) for example in the form of a Machine Type Communication (MTC) device, configured to implement herein described embodiments of a method for use in a UE, such as the UE method embodiments described in relation to FIG. 3A, 3B and FIG. 5. The UE 700 to this end comprises processor 702 and transceiver 704 circuitry operatively connected and configured for performing the method steps of any one or more of the herein described UE and MTC embodiments.

In the following, example realizations of two adaptation algorithms targeting a close-to-ideal mapping, i.e. correspondence, between RA preamble groups and uplink allocation sizes, is elaborated.

It is noted that although the example algorithms below use an adaptation interval, this is not the only conceivable way to design an adaptation algorithm. The correspondence between the RA preamble groups and uplink allocation sizes could also be more or less continuously recalculated, making the adaptation more or less continuous, by which a "sliding" or "rolling" correspondence can easily be conceived.

The frequency of adaptation updates is in principle limited only by the frequency of the system information transmissions. In the case the correspondence or mapping information were to be unicast to the UEs, instead of broadcast as described above, even more frequent updates would at least theoretically be possible. More frequent adaptation would however not necessarily be an advantage. Two notable disadvantages are that it would require the UEs to more frequently read the System Information (SI) and the risk of selecting a RA preamble from an incorrect RA preamble group, due to a preamble group selection based on outdated mapping or correspondence would increase.

Down below will be presented a few algorithm proposals. Algorithm proposal 1 is an algorithm wherein the parameter that is adapted is the number of RA preambles in each RA preamble group, whereas the corresponding UL resource allocation sizes, the number of RA preamble groups as well as the total number of dedicated RA preambles remain constant during the adaptation.

The basic concept of the algorithm proposal 1 is the following. For a fixed number of preamble groups with fixed RA preamble group-to-UL resource allocation size mapping or correspondence, a (semi-) fixed total number of preambles are distributed to the preamble groups. The preamble distribution is periodically updated, adapting to actual data amounts which are sent or buffered by UE or MTC devices and obtained by the eNodeB performing the adaptation. The goal of the adaptation is to make the number of preambles of each preamble group proportional to the number of UE or MTC device accesses using the preamble group.

It can be added that a close to ideal goal would be to achieve equal collision risk for all preamble groups, or, even better, to minimize the collision risk over all preamble groups together. This would result in slightly different relations between the numbers of preambles in the different groups than plain proportionality to the number of UE or MTC device accesses using the groups. However, as a result of a trade-off between idealism and complexity, the plain proportionality should be a good enough approximation.

Although the number of preamble groups in principle is fixed, the number of groups is in practice adapted when the number of preambles in one or more groups becomes zero through the preamble distribution adaptation.

The following notation is used:

P The total number of preambles allocated to the preamble groups.

N The number of preamble groups.

$G_i$ Preamble group i, where the index $i \in \{0, 1, 2, \ldots, N-1\}$.

$A_i$ UL resource allocation size mapping to preamble group $G_i$, where the index $i \in \{0, 1, 2, \ldots, N-1\}$.

$T_n$ Preamble distribution adaptation interval n, where n=1, 2, 3 ...

d A desired allocation size calculated as the sum of the Message 3 size and the UL buffer contents size indicated by a Buffer Status Report (BSR) in Message 3 minus the size of the actual Medium Access Control (MAC) BSR control element, with the assumption that the MAC BSR control element is omitted if the UL buffer is empty. That is, d=<size of Msg3>+<UL buffer size as indicated by BSR>−<size of MAC BSR control element>.

$D_n(A_i)$ The number of accesses during adaptation interval $T_n$ with d satisfying $A_{i-1} < d \leq A_i$ for $0 < i < N-1$, $d \leq A_i$ for i=0 and $A_{i-1} < d$ for i=N−1.

$\Phi_n(A_i)$ The fraction of MTC device accesses during adaptation interval $T_n$ with d satisfying $A_{i-1} < d$ for $0 < i < N-1$, $d \leq A_i$ for i=0 and $A_{i-1} < d$ for i=N−1.

$M_n(G_i)$ The fraction of the P preambles that are allocated to preamble group $G_i$ during preamble distribution adaptation interval $T_n$.

$p_n(G_i)$ The number of preambles that are allocated to preamble group $G_i$, i.e. $p_n(G_i) = |G_i|$, during preamble distribution adaptation interval $T_n$.

The goal of the adaptation can be expressed as:

To achieve an optimal or close to optimal distribution of the P preambles in the N preamble groups, that is, optimal or close to optimal values of $M_n(G_i)$ and $p_n(G_i)$ for all $i \in \{0, 1, 2, \ldots, N-1\}$.

A basic algorithm for adaptation of $M_n(G_i)$ and $p(G_i)$ is now discussed. The eNodeB measures d for all UE RA attempts or accesses during each preamble distribution adaptation interval. After each adaptation interval $T_n$ the eNodeB calculates for all $i \in \{0, 1, 2, \ldots, N-1\}$:

---

$D_n(A_i)$ $$\Phi_n(A_i) = \frac{D_n(A_i)}{\sum_{j \in \{0,1,\ldots,N-1\}} D_n(A_j)}$$

$M_{n+1}(G_i) = (1-\alpha)M_n(G_i) + \alpha\Phi_n(A_i)$ (where $0 \leq \alpha \leq 1$)

$p_{n+1}(G_i) = INT(M_{n+1}(G_i)P + 0.5)$ (That is, $p_{n+1}(G_i)$ is rounded to the integer value closest to $M_{n+1}(G_i)P$.)

Adjustments (if needed) to make sure that $\sum_{i \in \{0,1,\ldots,N-1\}} p_{n+1}(G_i) = P$:

$G = \{G_i : i \in \{0, \ldots N-1\}\}$;

WHILE $\sum_{i \in \{0,1,\ldots,N-1\}} p_{n+1}(G_i) \neq P$ DO {

IF $\sum_{i \in \{0,1,\ldots,N-1\}} p_{n+1}(G_i) < P$ THEN DO {

$q = \underset{i \in \{0,1,\ldots,N-1\}}{\operatorname{argmax}} (M_{n+1}(G_i)P - p_{n+1}(G_i))$;

$p_{n+1}(G_q) = p_{n+1}(G_q) + 1$;
    }

ELSE IF $\sum_{i \in \{0,1,\ldots,N-1\}} p_{n+1}(G_i) > P$ THEN DO { groupReduced = 'false';
    WHILE NOT groupReduced DO {

$q = \underset{i \in \{0,1,\ldots,N-1\}}{\operatorname{argmax}} (p_{n+1}(G_i) - M_{n+1}(G_i)P)$;

IF $p_{n+1}(G_q) \neq 0$ THEN DO {
            $p_{n+1}(G_q) = p_{n+1}(G_q) - 1$;
            groupReduced = 'true';
        }
        ELSE DO
            $G - \{G_i\}$; !COMMENT: $G_i$ is removed from G (may equally be expressed: $G \setminus \{G_i\}$);
    }
}
}

---

In the above algorithm exponential averaging, also known as low pass filtering, is used for the calculation of $M_n(G_i)$. An alternative is to use exponential averaging on the calculation of the number of accesses per UL resource allocation size interval and thus calculate an expected number of accesses for the next adaptation interval. For this alternative the following additional parameter is introduced:

$\Delta_n(A_j)$ The expected number of accesses during adaptation interval $T_n$ with d satisfying $A_{i-1} < d \leq A_i$ for $0 < i < N-1$, $d \leq A_i$ for i=0 and $A_{i-1} < d$ for i=N−1.

The basic algorithm above is then modified as follows:

The eNodeB measures d for all accesses during each preamble distribution adaptation interval. After each adaptation interval $T_n$ the eNodeB calculates for all $i \in \{0, 1, 2, \ldots, N-1\}$:

---

$D_n(A_i)$ $\Delta_{n+1}(A_j) = (1-\alpha)\Delta_n + \alpha D_n(A_j)$ (where $0 \leq \alpha \leq 1$)

$$M_{n+1}(G_i) = \frac{\Delta_{n+1}(A_i)}{\sum_{j \in \{0,1,\ldots,N-1\}} \Delta_{n+1}(A_j)}$$

$p_{n+1}(G_i) = INT(M_{n+1}(G_i)P + 0.5)$

---

(That is, $p_{n+1}(G_i)$ is rounded to the integer value closest to $M_{n+1}(G_i)P$.)

The possible adjustments to make sure that $$\sum_{i \in \{0,1,\ldots,N-1\}} p_{n+1}(G_i) = P$$

are the same as above.

The basic concept of the algorithm proposal 2 is the following. With this algorithm proposal, the parameter that is adapted is the UL resource allocation size that maps or corresponds to each preamble group, whereas the numbers of preambles in the corresponding preamble groups as well as the total number of dedicated preambles remain constant.

Within this algorithm proposal 2, two variants are presented below.

For the first variant, variant 1, the UL allocation sizes can be chosen freely.

The basic concept of variant 1 of algorithm proposal 2 is the following. For a fixed number of preamble groups with equal number of preambles per group a fixed total range of UL allocation sizes is divided among the preamble groups. The preamble groups have an equal share of a fixed or semi-fixed total number of preambles.

The correspondence or mapping between RA preamble groups and UL resource allocation sizes is periodically updated, adapting to actual data amounts which are sent or buffered by UE or MTC devices. The goal of the adaptation is to make the collision risk equal for all preamble groups, which corresponds to making the number of accesses using the preamble groups equal for all preamble groups.

To achieve the desired adaptation, the range of UL allocation sizes is divided into a rather large number of small sub-ranges, which are dynamically distributed and periodically redistributed to the preamble groups. The sub-ranges can be distributed and redistributed to the preamble groups in consecutive chunks.

The following notation is used:

P The total number of preambles allocated to the preamble groups.

N The number of preamble groups.

$G_i$ Preamble group i, where the index $i \in \{0, 1, 2, \ldots, N-1\}$.

$A_{i,n}$ UL allocation size mapping to preamble group $G_i$, during sub-range adaptation interval $T_n$, where the index $i \in \{0, 1, 2, \ldots, N-1\}$.

$a_j$ A small sub-range of the potential UL allocation size range, where $j \in \{0, 1, 2, \ldots, \Lambda-1\}$ and $\Lambda \gg N$ (and $\Lambda > N^2$).

$a_j^{(low)}$ The lower end of sub-range $a_j$. Note that $a_j^{(low)} = a_{j-1}^{(high)}$ for $1 \leq j \leq \Lambda-1$.

$a_j^{(high)}$ The upper end of sub-range $a_j$. Note that $a_j^{(high)} = a_{j+1}^{(high)}$ for $0 \leq j \leq \Lambda-2$.

$\Lambda$ The number of sub-ranges ($a_j$) of the potential UL allocation size range.

$T_n$ Sub-range distribution adaptation interval n, where n=1, 2, 3 . . .

d A desired allocation size calculated as the sum of the Message 3 (Msg3) size and the UL buffer contents size indicated by a BSR in Msg3 minus the size of the actual MAC BSR control element (assuming that the MAC BSR control element is omitted if the UL buffer is empty). That is, d=<size of Msg3>+<UL buffer size as indicated by BSR>−<size of MAC BSR control element>.

$D_n(a_j)$ The number of accesses during adaptation interval $T_n$ with d satisfying $a_{j-1} < d \leq a_j$ for $0 < j < \Lambda-1$, $d \leq a_j^{(high)}$ for j=0 and $d > a_{j-1}^{(high)} = a_j^{(low)}$ for j=Λ−1.

$\Delta_n(a_j)$ The expected number of accesses during adaptation interval $T_n$ with d satisfying $a_{j-1} < d \leq a_j$ for $0 < j < \Lambda-1$, $d \leq a_j^{(high)}$ for j=0 and $d > a_{j-1}^{(high)} = a_j^{(low)}$ for j=Λ−1.

It can be noted that the definition of $a_j$ eliminates the risk that there is no sub-range left to allocate to $A_{N-1}$ when all the other UL allocation sizes, that is $A_0 - A_{N-2}$, have received there allocations according the rudimentary algorithm.

The goal of this adaptation can be expressed as:

To achieve an optimal or close to optimal distribution of the Λ sub-ranges, that is the sub-ranges $a_j$ where $j \in \{0, 1, 2, \ldots, \Lambda-1\}$ to the N UL allocation sizes ($A_i$), and thus to the corresponding preamble groups $G_i$, that is optimal or close to optimal values of $A_{i,n}$ for all $i \in \{0, 1, 2, \ldots, N-1\}$.

Down below will be presented a basic algorithm for adaptive sub-range allocation.

The eNodeB measures d for all accesses during each sub-range distribution adaptation interval. After each adaptation interval $T_n$ the eNodeB first calculates $D_n(a_j)$ for all $j \in \{0, 1, 2, \ldots, \Lambda-1\}$ and then executes:

$$\Delta_{n+1}(a_j) = (1 - \alpha)\Delta_n + \alpha\, D_n(a_j); \ \text{!COMMENT: } (0 \leq \alpha \leq 1).$$

$$\text{accPerGroup} = \frac{\sum_{j \in \{0,1,\ldots,\Lambda-1\}} \Delta_{n+1}(a_j)}{N};$$

```
i = 0;
accSum = 0;
FOR j = 0 to j = Λ - 1 DO {
   accSum = accSum + Δ_{n+1}(a_j);
```

$$\text{numOfShares} = \frac{\text{accSum}}{\text{accPerGroup}};$$

```
   truncatedNumOfShares = INT(numOfShares + 0.5);
!COMMENT: In the following WHILE expression "i" represents the number of
!COMMENT: allocated shares.
   WHILE truncatedNumOfShares > i DO {
      A_{i,n+1} = a_j^{(high)};
      i = i + 1;
   }
}
```

With the above described basic variant of the algorithm each UL allocation size $A_i$, or preamble group $G_i$, for $i < N-1$ is allocated its "fair" share or slightly more than its fair share of the number of accesses. As a consequence UL allocation size $A_{N-1}$, and preamble group $G_{N-1}$, will typically be allocated less than its fair share of the number of accesses, except in exceptional cases where all of the UL allocation sizes $A_0 - A_{N-2}$, or preamble groups $G_0 - G_{N-2}$ receive exactly their fair shares of the number of accesses.

This cannot be regarded as a problem since UL allocation size $A_{N-1}$, which is the largest UL allocation size, will anyway be insufficient for many accesses, that is, for the accesses for which d is greater than the upper end of $a_{\Lambda-1}$. This is rather an acceptable compromise to keep the algorithm simple. It can moreover be observed for the above algorithm, that several UL allocation sizes may be equal. Several preamble groups may thus be mapped to the same UL allocation size, which in practice means that these preamble groups are merged.

Down below will be presented an algorithm for adaptive sub-range allocation that is slightly more advanced than the previously presented basic one.

In this slightly more advanced algorithm, an UL allocation size, $A_i$, is set equal to the upper end of the sub-range that results in the expected number of accesses per preamble group being the closest to accPerGroup.

It can be noted that this may result in that $A_{N-1}$ ends up receiving more than its "fair" share of the number of accesses.

With this alternative algorithm the eNodeB, after each adaptation interval $T_n$, first calculates $D_n(a_j)$ for all $j \in \{0, 1, 2, \ldots, \Lambda-1\}$, just as in the above described basic algorithm, and then executes:

$$\Delta_{n+1}(a_j) = (1 - \alpha)\Delta_n + \alpha\, D_n(a_j); \ \text{!COMMENT: } (0 \leq \alpha \leq 1).$$

$$\text{accPerGroup} = \frac{\sum_{j \in \{0,1,\ldots,\Lambda-1\}} \Delta_{n+1}(a_j)}{N};$$

-continued

```
i = 0;
accSum = 0;
prevAccSum = 0;
FOR j = 0 to j = Λ - 1 DO {
    prevAccSum = accSum;
    accSum = accSum + Δ_{n+1}(a_j);
```

$$numOfShares = \frac{accSum}{accPerGroup};$$

```
    truncatedNumOfShares = INT(numOfShares + 0.5);
!COMMENT: In the following WHILE expression "i" represents the number of
!COMMENT: allocated shares.
    WHILE truncatedNumOfShares > i DO {
        IF accSum - accPerGroup × (i + 1) ≤
        accPerGroup × (i + 1) - prevAccSum
        OR j = 0 THEN DO
            A_{i,n+1} = a_j^{(high)};
        ELSE DO
            A_{i,n+1} = a_{j-1}^{(high)};
        i = i + 1;
    }
}
```

Although the slightly more advanced algorithm will probably perform better than the basic algorithm, it may be a modest improvement and the algorithm may be far from perfect. To achieve an "optimal" distribution of the sub-ranges it would essentially be needed to attempt all possible combinations of approximations of sub-range sequences, including upwards or downwards "rounding" to a sub-range edge.

However, since, as previously mentioned, the UL allocation size $A_{N-1}$, being the largest UL allocation size, will anyway be insufficient for many accesses, that is for the accesses for which d is greater than the upper end of $a_{\Lambda-1}$, sub-range allocation refinements on top of what the simple algorithm achieves may be superfluous and may even result in a worse performance.

Also with this alternative algorithm several UL allocation sizes may be equal. Several preamble groups may thus be mapped to the same UL allocation size, which in practice means that these preamble groups are merged.

For the second variant, variant 2, the UL allocation sizes are restricted to Transport Block (TB) sizes.

It is noted that there may be a further point to indicate an allocation size which corresponds to one of the available Transport Block (TB) sizes. Therefore it can be useful to modify the above algorithms of variant 1 as presented above so that only available transport block sizes are considered when choosing the values of the UL allocation sizes ($A_i$).

The following notation is thus further added:
Z The number of available transport blocks.
$TBsize_s$ An available transport block size, where $s \in \{0, 1, 2, \ldots, Z-1\}$.

A modified basic algorithm for adaptive sub-range allocation with only available transport block sizes allowed will now be discussed. In this modified variant of the basic algorithm of variant 1 $A_i$ is set to the smallest available transport block size that covers or exceeds $A_i$'s "fair" share of the expected number of accesses.

The eNodeB measures d for all accesses during each sub-range distribution adaptation interval. After each adaptation interval $T_n$ the eNodeB first calculates $D_n(a_j)$ for all $j \in \{0, 1, 2, \ldots, \Lambda-1\}$ and then executes:

$$\Delta_{n+1}(a_j) = (1 - \alpha)\Delta_n + \alpha\, D_n(a_j); \quad !COMMENT: (0 \le \alpha \le 1).$$

$$accPerGroup = \frac{\sum_{j \in \{0,1,\ldots,\Lambda-1\}} \Delta_{n+1}(a_j)}{N};$$

```
i = 0;
s = 0;
accSum = 0;
FOR j = 0 to j = Λ - 1 DO {
    accSum = accSum + Δ_{n+1}(a_j);
```

$$numOfShares = \frac{accSum}{accPerGroup};$$

```
    truncatedNumOfShares = INT(numOfShares + 0.5);
!COMMENT: In the following WHILE expression "i" represents the number of
!COMMENT: allocated shares.
    WHILE truncatedNumOfShares > i DO {
        WHILE^{TBsize_s < a_j^{(high)}} DO
            s = s + 1;
        A_{i,n+1} = TBsize_s;
        i = i + 1;
    }
}
```

A modified slightly more advanced algorithm for adaptive sub-range allocation with only available transport block sizes will now be discussed. In this modified variant of the slightly more advanced algorithm of variant 1 $A_i$ is set to the one of the available transport block sizes that results in the covered expected number of accesses being the closest to $A_i$'s "fair" share.

The eNodeB measures d for all accesses during each sub-range distribution adaptation interval. After each adaptation interval $T_n$ the eNodeB first calculates $D_n(a_j)$ for all $j \in \{0, 1, 2, \ldots, \Lambda-1\}$ and then executes:

$$\Delta_{n+1}(a_j) = (1 - \alpha)\Delta_n + \alpha\, D_n(a_j); \quad !COMMENT: (0 \le \alpha \le 1).$$

$$accPerGroup = \frac{\sum_{j \in \{0,1,\ldots,\Lambda-1\}} \Delta_{n+1}(a_j)}{N};$$

```
s = 0;
i = 0;
accSum = 0;
prevAccSum = 0;
FOR j = 0 to j = Λ - 1 DO {
    prevAccSum = accSum;
    accSum = accSum + Δ_{n+1}(a_j);
    WHILE^{a_j^{(high)} > TBsize_s} DO {
        numOfAccCoveredByTBsize_s =
```

$$= prevAccSum + \frac{TBsize_s - a_j^{(low)}}{a_j^{(high)} - a_j^{(low)}} \Delta_{n+1}(a_j)\ ;$$

```
        numOfSharesCoveredByTBsize_s =
```

$$= \frac{numOfAccCoveredByTBsize_s}{accPerGroup};$$

```
        truncatedNumOfSharesCoveredByTBsize_s =
        = INT(numOfSharesCoveredByTBsize_s + 0.5);
        WHILE truncatedNumOfSharesCoveredByTBsize_s > i
        DO {
            IF s = 0 THEN DO
                A_{i,n+1} = TBsize_s;
            ELSE IF numOfAccCoveredByTBsize_s -
            accPerGroup × (i + 1)
            ≤ accPerGroup × (i + 1) -
            numOfAccCoveredByTBsize_{s-1} = 0
```

```
            THEN DO
                A_{i,n+1} = TBsize_s;
            ELSE DO
                A_{i,n+1} = TBsize_{s-1};
            i = i + 1;
        }
        s = s + 1
    }
}
```

Further alternative embodiments of the present invention will now be discussed.

The adaptation of correspondence between RA preamble groups and uplink allocation sizes, may be performed dynamically in the respect that parameters of the algorithm are dynamically adapted.

Some of the parameters that affect the algorithms' properties may hence be dynamically adapted so that the algorithms may be automatically tuned for better performance over time, or to maintain good performance in the presence of changing conditions. Self-tuning and self-adapting algorithms are examples of Self Optimizing Network (or Self Organizing Network) (SON) features. The entire concept of adaptive correspondence between RA preamble groups and uplink allocation sizes is also a SON feature.

One example of a parameter that is well suited for dynamic adaptation is the $\alpha$ parameter. The $\alpha$ parameter governs the algorithms' responsiveness, in terms of adaptation/convergence speed, together with the length of the preamble/sub-range distribution adaptation interval T. Selecting a suitable value of $\alpha$ is however non-trivial. Hence, automatic adaptation of $\alpha$ is preferable.

It is introduced a repetitive $\alpha$ adaptation interval $\tau_m$, where m=1, 2, 3 . . . and $\tau$=cT, where c is an integer constant. For example, setting c=20, means $\tau$>>T. Adaptation of $\alpha$ occurs before the start of a new $\alpha$ adaptation interval and $\alpha$ is then kept constant for the duration of the $\alpha$ adaptation interval. In addition, for the purpose of evaluating the performance of the $\alpha$ parameter, the eNodeB maintains two trial $\alpha$ values that are herein denoted $\alpha^-$ and $\alpha^+$, for which the performance is also tracked. These $\alpha^-$ and $\alpha^+$ may be regarded as lower and upper values of the $\alpha$ parameter.

After each $\alpha$ adaptation interval the eNodeB determines which of the three $\alpha$ values, the regular or one of the two trial values, that is $\alpha^-$, $\alpha$ and $\alpha^+$, that performed the best during the elapsed $\alpha$ adaptation interval. If either one of $\alpha^-$ and $\alpha^+$ performs better than the regular $\alpha$ value, then for the next $\alpha$ adaptation interval $\alpha$ is adapted to the better performing value. Let $\alpha_m$ denote the $\alpha$ value during $\alpha$ adaptation interval $\tau_m$. and let $T_{k,m}$ denote a preamble/sub-range distribution adaptation interval during $\alpha$ adaptation interval $\tau_m$ with $$k \in \left\{0, 1, \ldots, \frac{\tau}{T} - 1\right\}.$$

That is, for the $\alpha$ adaptation algorithm the following further notation is introduced:

$\tau_m$ $\alpha$ adaptation interval m, where m=1, 2, 3 . . . and $\tau$=cT, where c is an integer constant.

$\alpha_m^-$ A trial $\alpha$ value for $\alpha$ adaptation interval m, where $\alpha_m^- < \alpha_m$.

$\alpha_m^+$ A trial $\alpha$ value for $\alpha$ adaptation interval m, where $\alpha_m^+ > \alpha_m$.

$T_{k,m}$ Preamble/sub-range distribution adaptation interval k during $\alpha$ adaptation interval m, where $$k \in \left\{0, 1, \ldots, \frac{\tau}{T} - 1\right\}.$$

$G_{i,k,m}^-$ A trial calculation of $G_{i,k,m}$ for preamble distribution adaptation interval k during $\alpha$ adaptation interval m using $\alpha_m^-$.

$G_{i,k,m}^+$ A trial calculation of $G_{i,k,m}$ for preamble distribution adaptation interval k during $\alpha$ adaptation interval m using $\alpha_m^+$.

$M_{k,m}^-(G_{i,k,m}^-)$ A trial calculation of $M_{k,m}(G_{i,k,m})$ for preamble distribution adaptation interval k during $\alpha$ adaptation interval m using $\alpha_m^-$.

$M_{k,m}^+(G_{i,k,m}^+)$ A trial calculation of $M_{k,m}(G_{i,k,m})$ for preamble distribution adaptation interval k during $\alpha$ adaptation interval m using $\alpha_m^-$.

$A_{i,k,m}^-$ A trial calculation of $A_{i,k,m}$ for sub-range distribution adaptation interval k during $\alpha$ adaptation interval m using $\alpha_m^-$.

$A_{i,k,m}^+$ A trial calculation of $A_{i,k,m}$ for sub-range distribution adaptation interval k during $\alpha$ adaptation interval m using $\alpha_m^+$.

$\Phi_{k,m}^-(A_{i,k,m}^-)$ A trial calculation of $\Phi_{k,m}(A_{i,k,m})$ for sub-range distribution adaptation interval k during $\alpha$ adaptation interval m using $\alpha_m^-$.

$\Phi_{k,m}^+(A_{i,k,m}^+)$ A trial calculation of $\Phi_{k,m}(A_{i,k,m})$ for sub-range distribution adaptation interval k during $\alpha$ adaptation interval m using $\alpha_m^+$.

During each $\alpha$ adaptation interval $\tau_m$ the eNodeB tracks the performance of $\alpha_m$, $\alpha_m^-$ and $\alpha_m^+$ by calculating an error parameter, that is a deviation from target, for each $\alpha$ value, after each preamble/sub-range distribution adaptation interval $T_{k,m}$, for all $$k \in \left\{0, 1, \ldots, \frac{\tau}{T} - 1\right\}$$

and all i$\in$\{0, 1, 2, . . . , N–1\} an error parameter, that is deviation from target, for each $\alpha$ value.

For the proposal 1 algorithm the error parameters may be calculated as follows:

$$E_{k,m}^\alpha = \sum_{i \in \{0,1,\ldots,N-1\}} \sqrt{(M_{k,m}(G_{i,k,m}) - \Phi_{k,m}(A_i))^2} = \sum_{i \in \{0,1,\ldots,N-1\}} |M_{k,m}(G_{i,k,m}) - \Phi_{k,m}(A_i)|$$

(where $M_{k,m}(G_{i,k,m})$ is calculated using $\alpha_m$);

$$E_{k,m}^{\alpha^-} = \sum_{i \in \{0,1,\ldots,N-1\}} \sqrt{(M_{k,m}^-(G_{i,k,m}^-) - \Phi_{k,m}(A_i))^2} = \sum_{i \in \{0,1,\ldots,N-1\}} |M_{k,m}^-(G_{i,k,m}^-) - \Phi_{k,m}(A_i)|$$

(where $M_{k,m}^-(G_{i,k,m}^-)$ is calculated using $\alpha_m^-$);

$$E_{k,m}^{\alpha^+} = \sum_{i\in\{0,1,\ldots,N-1\}} \sqrt{(M_{k,m}^+(G_{i,k,m}^+) - \Phi_{k,m}(A_i))^2} =$$

$$\sum_{i\in\{0,1,\ldots,N-1\}} |M_{k,m}^+(G_{i,k,m}^+) - \Phi_{k,m}(A_i)|$$

(where
$M_{k,m}^+(G_{i,k,m}^+)$ is calculated using $\alpha_m^+$).

For the proposal 2 algorithms the fraction of the preambles that is allocated to each preamble group is fixed and equal for all preamble groups, as the goal of those algorithms' is to adapt the correspondence between RA preamble groups and UL allocation sizes so that the number of accesses is equal for all preamble groups. Hence, for the proposal 2 algorithms, $M_{k,m}(G_i)$ may be replaced by 1/N in the calculations of the error parameters above, resulting in the following modified calculations. It is noted that since the number of accesses per preamble group will vary depending on the RA preamble group to UL allocation size correspondence, which in turn depend on the $\alpha$ values, the eNodeB will measure different $A_{i,k,m}$ values and $\Phi_{k,m}(A_{i,k,m})$ values for different $\alpha$ values):

$$E_{k,m}^{\alpha} =$$

$$\sum_{i\in\{0,1,\ldots,N-1\}} \sqrt{\left(\frac{1}{N} - \Phi_{k,m}(A_{i,k,m})\right)^2} = \sum_{i\in\{0,1,\ldots,N-1\}} \left|\frac{1}{N} - \Phi_{k,m}(A_{i,k,m})\right|$$

(where $A_{i,k,m}$ and $\Phi_{k,m}(A_{i,k,m})$ are calculated using $\alpha_m$);

$$E_{k,m}^{\alpha^-} =$$

$$\sum_{i\in\{0,1,\ldots,N-1\}} \sqrt{\left(\frac{1}{N} - \Phi_{k,m}^-(A_{i,k,m}^-)\right)^2} = \sum_{i\in\{0,1,\ldots,N-1\}} \left|\frac{1}{N} - \Phi_{k,m}^-(A_{i,k,m}^-)\right|$$

(where $A_{i,k,m}^-$ and $\Phi_{k,m}^-(A_{i,k,m}^-)$ are calculated using $\alpha_m^-$);

$$E_{k,m}^{\alpha^+} =$$

$$\sum_{i\in\{0,1,\ldots,N-1\}} \sqrt{\left(\frac{1}{N} - \Phi_{k,m}^+(A_{i,k,m}^+)\right)^2} = \sum_{i\in\{0,1,\ldots,N-1\}} \left|\frac{1}{N} - \Phi_{k,m}^+(A_{i,k,m}^+)\right|$$

(where $A_{i,k,m}^+$ and $\Phi_{k,m}^+(A_{i,k,m}^+)$ are calculated using $\alpha_m^+$).

For the proposal 2 algorithms and for the alternative variant of the basic proposal 1 algorithm, the calculations of the error parameters may also be based on the discrepancies between $D_n$ and $\Delta_n$. For these calculations the following further notation is introduced:

$\Delta_{k,m}^-(A_i)$ A trial calculation of $\Delta_{k,m}(A_i)$ for preamble distribution adaptation interval k during $\alpha$ adaptation interval m using $\alpha_m^-$.

$\Delta_{k,m}^+(A_i)$ A trial calculation of $\Delta_{k,m}(A_i)$ for preamble distribution adaptation interval k during $\alpha$ adaptation interval m using $\alpha_m^+$.

$\Delta_{k,m}^-(A_{i,k,m}^-)$ A trial calculation of $\Delta_{k,m}(A_{i,k,m})$ for sub-range distribution adaptation interval k during $\alpha$ adaptation interval m using $\alpha_m^-$.

$\Delta_{k,m}^+(A_{i,k,m}^+)$ A trial calculation of $\Delta_{k,m}(A_{i,k,m})$ for sub-range distribution adaptation interval k during $\alpha$ adaptation interval m using $\alpha_m^+$.

$\Delta_{k,m}^-(a_j)$ A trial calculation of $\Delta_{k,m}(a_j)$ for preamble distribution adaptation interval k during $\alpha$ adaptation interval m using $\alpha_m^-$.

$\Delta_{k,m}^+(a_j)$ A trial calculation of $\Delta_{k,m}(a_j)$ for preamble distribution adaptation interval k during $\alpha$ adaptation interval m using $a_m^+$.

The error parameter calculations for the alternative variant of the basic proposal 1 algorithm then become:

$$E_{k,m}^{\alpha} = \sum_{i\in\{0,1,\ldots,N-1\}} \sqrt{(\Delta_{k,m}(A_i) - D_{k,m}(A_i))^2} =$$

$$\sum_{i\in\{0,1,\ldots,N-1\}} |\Delta_{k,m}(A_i) - D_{k,m}(A_i)|$$

(where $\Delta_{k,m}(A_i)$ is calculated using $\alpha_m$)

$$E_{k,m}^{\alpha^-} = \sum_{i\in\{0,1,\ldots,N-1\}} \sqrt{(\Delta_{k,m}^-(A_i) - D_{k,m}(A_i))^2} =$$

$$\sum_{i\in\{0,1,\ldots,N-1\}} |\Delta_{k,m}^-(A_i) - D_{k,m}(A_i)|$$

(where $\Delta_{k,m}^-(A_i)$ is calculated using $\alpha_m^-$)

$$E_{k,m}^{\alpha^+} = \sum_{i\in\{0,1,\ldots,N-1\}} \sqrt{(\Delta_{k,m}^+(A_i) - D_{k,m}(A_i))^2} =$$

$$\sum_{i\in\{0,1,\ldots,N-1\}} |\Delta_{k,m}^+(A_i) - D_{k,m}(A_i)|$$

(where $\Delta_{k,m}^+(A_i)$ is calculated using $\alpha_m^+$)

It can be added the two alternative error parameter calculations for the alternative variant of the basic proposal 1 algorithm are connected through the relation $$\Delta_{k,m}(A_i) = M_{k,m}(G_{i,k,m}) \sum_{j\in\{0,1,\ldots,N-1\}} \Delta_{k,m}(A_j).$$

For the proposal 2 algorithms the error parameter calculations become:

$$E_{k,m}^{\alpha} = \sum_{i\in\{0,1,\ldots,N-1\}} \sqrt{(\Delta_{k,m}(A_{i,k,m}) - D_{k,m}(A_{i,k,m}))^2} =$$

$$\sum_{i\in\{0,1,\ldots,N-1\}} |\Delta_{k,m}(A_{i,k,m}) - D_{k,m}(A_{i,k,m})|$$

(where $\Delta_{k,m}(A_{i,k,m})$ is calculated using $\alpha_m$)

$$E_{k,m}^{\alpha^-} = \sum_{i\in\{0,1,\ldots,N-1\}} \sqrt{(\Delta_{k,m}^-(A_{i,k,m}^-) - D_{k,m}(A_{i,k,m}^-))^2} =$$

$$\sum_{i\in\{0,1,\ldots,N-1\}} |\Delta_{k,m}^-(A_{i,k,m}^-) - D_{k,m}(A_{i,k,m}^-)|$$

(where $\Delta_{k,m}^-(A_{i,k,m}^-)$ is calculated using $\alpha_m^-$)

$$E_{k,m}^{\alpha*} = \sum_{i \in \{0,1,\ldots,N-1\}} \sqrt{(\Delta_{k,m}^+(A_{i,k,m}^+) - D_{k,m}(A_{i,k,m}^+))^2} =$$

$$\sum_{i \in \{0,1,\ldots,N-1\}} |\Delta_{k,m}^+(A_{i,k,m}^+) - D_{k,m}(A_{i,k,m}^+)|$$

(where $\Delta_{k,m}^+(A_{i,k,m}^+)$ is calculated using $\alpha_m^+$).

Alternatively, the error parameter calculations for the proposal 2 algorithms could be:

$$E_{k,m}^\alpha = \sum_{j \in \{0,1,\ldots,\Lambda-1\}} \sqrt{(\Delta_{k,m}(a_j) - D_{k,m}(a_j))^2} =$$

$$\sum_{i \in \{0,1,\ldots,N-1\}} |\Delta_{k,m}(a_j) - D_{k,m}(a_j)|$$

(where $\Delta_{k,m}(a_j)$ is calculated using $\alpha_m$)

$$E_{k,m}^{\alpha^-} = \sum_{j \in \{0,1,\ldots,\Lambda-1\}} \sqrt{(\Delta_{k,m}^-(a_j) - D_{k,m}(a_j))^2} =$$

$$\sum_{i \in \{0,1,\ldots,N-1\}} |\Delta_{k,m}^-(a_j) - D_{k,m}(a_j)|$$

(where $\Delta_{k,m}^-(a_j)$ is calculated using $\alpha_m^-$)

$$E_{k,m}^{\alpha^+} \sum_{j \in \{0,1,\ldots,\Lambda-1\}} \sqrt{(\Delta_{k,m}^+(a_j) - D_{k,m}(a_j))^2} =$$

$$\sum_{i \in \{0,1,\ldots,N-1\}} |\Delta_{k,m}^+(a_j) - D_{k,m}(a_j)|$$

(where $\Delta_{k,m}^+(a_j)$ is calculated using $\alpha_m^+$)

As the next step of the $\alpha$ evaluation, after each $\alpha$ adaptation interval $\tau_m$, before the start of the subsequent $\alpha$ adaptation interval $\tau_{m+1}$, the eNodeB calculates:

$$S_m^{E^\alpha} = \sum_{k \in \{0,1,\ldots,\frac{T}{T}-1\}} E_{k,m}^\alpha$$

(a measure of the performance of $\alpha_m$)

$$S_m^{E^{\alpha^-}} = \sum_{k \in \{0,1,\ldots,\frac{T}{T}-1\}} E_{k,m}^{\alpha^-}$$

(a measure of the performance of $\alpha_m^-$)

$$S_m^{E^{\alpha^+}} = \sum_{k \in \{0,1,\ldots,\frac{T}{T}-1\}} E_{k,m}^{\alpha^+}$$

(a measure of the performance of $\alpha_m^+$)

IF $\left(S_m^{E^\alpha} \leq S_m^{E^{\alpha^-}} \text{ AND } S_m^{E^\alpha} \leq S_m^{E^{\alpha^+}}\right)$ OR $S_m^{E^{\alpha^+}} = S_m^{E^{\alpha^-}}$ THEN DO {

$\alpha_{m+1} = \alpha_m$;
}

ELSE IF $S_m^{E^{\alpha^-}} < S_m^{E^\alpha}$ AND $S_m^{E^{\alpha^-}} < S_m^{E^{\alpha^+}}$ THEN DO {

$\alpha_{m+1} = (1 - \beta)\alpha_m + \beta\alpha_m^-$; !COMMENT: $0 < \beta < 1$
}
ELSE IF $S_m^{E^{\alpha^+}} < S_m^{E^\alpha}$ AND $S_m^{E^{\alpha^+}} < S_m^{E^{\alpha^-}}$ THEN DO {
   $\alpha_{m+1} = (1 - \beta)\alpha_m + \beta\alpha_m^+$; !COMMENT $0 < \beta < 1$
}

$$\delta = \text{MIN}\left(0.1, \frac{\alpha_{m+1}}{2}, \frac{1 - \alpha_{m+1}}{2}\right)$$

$\alpha_{m+1}^- = \alpha_{m+1} - \delta$
$\alpha_{m+1}^+ = \alpha_{m+1} + \delta$ Similar to the dynamic adaptation of parameter $\alpha$, an adaptation of parameter $\beta$ would be feasible. However, such an adaptation is considered not to be worthwhile. Rather, parameter $\beta$ has a fixed value in the range $0<\beta<1$.

As mentioned above, the $\alpha$ parameter governs the algorithm's responsiveness in terms of adaptation/convergence speed, together with the length of the preamble/sub-range distribution adaptation interval T. Hence, automatic adaptation of T could also be beneficial. However, simultaneously executed adaptation algorithms for $\alpha$ and T are likely to interfere disadvantageously with each other and hence it may be recommended to adapt only one of the parameters, while the other is kept constant.

In the choice between adaptation of $\alpha$ and adaptation of T, adaptation of $\alpha$ may be the preferable alternative. Nevertheless, if adaptation of T is desired, the algorithm that will be described down below may be used:

Similar to the $\alpha$ adaptation algorithm the eNodeB maintains two trial T values, $T^-$ and $T^+$, for which the performance is tracked along with the performance of the regular T value. A repetitive T adaptation interval $I_l$, is also introduced, where $l=1, 2, 3 \ldots$ and preferably $I \gg T$. To facilitate tracking and comparing of the performance of the T, $T^-$ and $T^+$ values, the T adaptation interval should be an integer number of each of these three values, i.e. $I=\nu T$, $I=\nu^- T^-$ and $I=\nu^+ T^+$, where $\nu$, $\nu^-$ and $\nu^+$ are integer constants. These conditions constrain the freedom in the selection of $T^-$, $T^+$ and I in relation to T. One suitable combination could be $$T^- = \frac{4T}{5},$$

$$T^+ = \frac{6T}{5}$$

and $I=12T$, that is with $\nu=12$, $\nu^-=15$ and $\nu^+=10$. Another combination could be $$T^- = \frac{3T}{4},$$

$$T^+ = \frac{5T}{4}$$

and $i=15T$, that is with $\nu=15$, $\nu^-=20$ and $\nu^+=12$. Yet another example is $$T^- = \frac{T}{2},$$

$T^+=2T$ and $I=20T$, that is $v=20$, $v^-=40$ and $v^+=10$. The T adaptation interval I is thus not fixed, but will be adapted as T is adapted.

Adaptation of T occurs before the start of a new T adaptation interval and is then kept constant for the duration of the T adaptation interval. After each T adaptation interval the eNodeB determines which of the three T values, the regular one or one of the two trial values, that performed the best during the elapsed T adaptation interval and, if needed, adapts the regular T value for the next T adaptation interval.

Let $T_l$ denote the T value during T adaptation interval $I_l$ and let $T_{w,l}$ denote the preamble/sub-range distribution adaptation intervals during T adaptation interval $I_l$ with $w \in \{0, 1, \ldots, v-1\}$. Similarly, let $T_l^-$ and $T_l^+$ denote the $T^-$ and $T^+$ values during T adaptation interval $I_l$ and let $T_{r,l}^-$ and $T_{u,l}^+$ denote the respective trial preamble/sub-range distribution adaptation intervals during T adaptation interval $I_l$ with $r \in \{0, 1, \ldots, v^--1\}$ and $u \in \{0, 1, \ldots, v^+-1\}$.

That is, for the T adaptation interval adaptation algorithm the following further notation is introduced:

$I_l$ T adaptation interval l, where $l=1, 2, 3 \ldots$ and $I_l=vT_l=v^-T_l^-+v^+T_l^+$, where $v$, $v^-$ and $v^+$ are integer constants.

$T_l^-$ A trial T value for T adaptation interval l, where $$T_l^- = \frac{v}{v^-} T_l > T_l.$$

$T_l^+$ A trial T value for T adaptation interval l, where $$T_l^+ = \frac{v}{v^+} T_l < T_l.$$

$T_{w,l}$ Preamble/sub-range distribution adaptation interval w during T adaptation interval $I_l$ with $w \in \{0, 1, \ldots, v-1\}$.

$T_{r,l}^-$ Trial preamble/sub-range distribution adaptation interval r during T adaptation interval $I_l$ with $r \in \{0, 1, \ldots, v^--1\}$.

$T_{u,l}^+$ Trial preamble/sub-range distribution adaptation interval u during T adaptation interval $I_l$ with $u \in \{0, 1, \ldots, v^+-1\}$.

$v$ An integer constant $$v = \frac{I_l}{T_l}$$

for all $l=1, 2, 3 \ldots$ $v^-$ An integer constant $$v^- = \frac{I_l}{T_l^-}$$

for all $l=1, 2, 3 \ldots$ $v^+$ An integer constant $$v^+ = \frac{I_l}{T_l^+}$$

for all $l=1, 2, 3 \ldots$

During each T adaptation interval $I_l$ the eNodeB tracks the performance of $T_l$, $T_l^-$ and $T_l^+$ by calculating accumulated deviations of the preamble distributions from the actual outcome of the access distribution.

After each preamble/sub-range distribution adaptation interval $T_{w,l}$, for all $w \in \{0, 1, \ldots, v-1\}$ and all $i \in \{0, 1, 2, \ldots, N-1\}$, the eNodeB calculates:

For the basic proposal 1 algorithm:

$$E_{w,l}^T = \sum_{i \in \{0,1,\ldots,N-1\}} \sqrt{(M_{w,l}(G_{i,w,l}) - \Phi_{w,l}(A_i))^2} = \sum_{i \in \{0,1,\ldots,N-1\}} |M_{w,l}(G_{i,w,l}) - \Phi_{w,l}(A_i)|$$

(where $G_{i,w,l}$ and $M_{w,l}(G_{i,w,l})$ are calculated and $\Phi_{w,l}(A_i)$ is measured during a period of length $T_l$)

For the alternative variant of the basic proposal 1 algorithm:

$$E_{w,l}^T = \sum_{i \in \{0,1,\ldots,N-1\}} \sqrt{(\Delta_{w,l}(A_i) - D_{w,l}(A_i))^2} = \sum_{i \in \{0,1,\ldots,N-1\}} |\Delta_{w,l}(A_i) - D_{w,l}(A_i)|$$

(where $\Delta_{w,l}(A_i)$ is calculated and $D_{w,l}(A_i)$ is measured during a period of length $T_l$)

For the proposal 2 algorithms:

$$E_{w,l}^T = \sum_{i \in \{0,1,\ldots,N-1\}} \sqrt{\left(\frac{1}{N} - \Phi_{w,l}(A_{i,w,l})\right)^2} = \sum_{i \in \{0,1,\ldots,N-1\}} \left|\frac{1}{N} - \Phi_{w,l}(A_{i,w,l})\right|$$

(where $A_{i,w,l}$ is calculated and $\Phi_{w,l}(A_{i,w,l})$ is measured during a period of length $T_l$)

Possible alternatives for the proposal 2 algorithms:

$$E_{w,l}^T = \sum_{i \in \{0,1,\ldots,N-1\}} \sqrt{(\Delta_{w,l}(A_{i,w,l}) - D_{w,l}(A_{i,w,l}))^2} = \sum_{i \in \{0,1,\ldots,N-1\}} |\Delta_{w,l}(A_{i,w,l}) - D_{w,l}(A_{i,w,l})|$$

(where $A_{i,w,l}$ and $\Delta_{w,l}(A_{i,w,l})$ are calculated and $D_{w,l}(A_{i,w,l})$ is measured during a period of length $T_l$) or $$E_{w,l}^T = \sum_{j \in \{0,1,\ldots,\Lambda-1\}} \sqrt{(\Delta_{w,l}(a_j) - D_{w,l}(a_j))^2} = \sum_{j \in \{0,1,\ldots,\Lambda-1\}} |\Delta_{w,l}(a_j) - D_{w,l}(a_j)|$$

(where $\Delta_{w,l}(a_j)$ is calculated and $D_{w,l}(a_j)$ is measured during a period of length $T_l$)

After each trial preamble/sub-range distribution adaptation interval $T_{r,l}^-$, for all $r \in \{0, 1, \ldots, v^--1\}$ and all $i \in \{0, 1, 2, \ldots, N-1\}$, the eNodeB calculates:

For the basic proposal 1 algorithm:

$$E_{w,l}^{T^-} = \sum_{i\in\{0,1,\ldots,N-1\}} \sqrt{(M_{r,l}^-(G_{i,r,l}^-) - \Phi_{r,l}^-(A_i))^2} = \sum_{i\in\{0,1,\ldots,N-1\}} |M_{r,l}^-(G_{i,r,l}^-) - \Phi_{r,l}^-(A_i)|$$

(where $G_{i,r,l}^-$ and $M_{r,l}^-(G_{i,r,l}^-)$ are calculated, and $\Phi_{r,l}^-(A_i)$ is measured, during a period of length $T_l^-$).

For the alternative variant of the basic proposal 1 algorithm:

$$E_{r,l}^T = \sum_{i\in\{0,1,\ldots,N-1\}} \sqrt{(\Delta_{r,l}^-(A_i) - D_{r,l}^-(A_i))^2} = \sum_{i\in\{0,1,\ldots,N-1\}} |\Delta_{r,l}^-(A_i) - D_{r,l}^-(A_i)|$$

(where $\Delta_{r,l}^-(A_i)$ is calculated, and $D_{r,l}^-(A_i)$ is measured, during a period of length $T_l^-$)

For the proposal 2 algorithms:

$$E_{r,l}^{T^-} = \sum_{i\in\{0,1,\ldots,N-1\}} \sqrt{\left(\frac{1}{N} - \Phi_{r,l}^-(A_{i,r,l}^-)\right)^2} = \sum_{i\in\{0,1,\ldots,N-1\}} \left|\frac{1}{N} - \Phi_{r,l}^-(A_{i,r,l}^-)\right|$$

(where $A_{i,r,l}^-$ is calculated and $\Phi_{r,l}^-(A_{i,r,l}^-)$ is measured during a period of length $T_l^-$)

Possible alternatives for the proposal 2 algorithms:

$$E_{r,l}^{T^-} = \sum_{i\in\{0,1,\ldots,N-1\}} \sqrt{(\Delta_{r,l}^-(A_{i,r,l}^-) - D_{r,l}^-(A_{i,r,l}^-))^2} = \sum_{i\in\{0,1,\ldots,N-1\}} |\Delta_{r,l}^-(A_{i,r,l}^-) - D_{r,l}^-(A_{i,r,l}^-)|$$

(where $A_{i,r,l}^-$ and $\Delta_{r,l}^-(A_{i,r,l}^-)$ are calculated and $D_{r,l}^-(A_{i,r,l}^-)$ is measured during a period of length $T_l^-$)

or $$E_{r,l}^T = \sum_{j\in\{0,1,\ldots,\Lambda-1\}} \sqrt{(\Delta_{r,l}^-(a_j) - D_{r,l}^-(a_j))^2} = \sum_{j\in\{0,1,\ldots,\Lambda-1\}} |\Delta_{r,l}^-(a_j) - D_{r,l}^-(a_j)|$$

(where $\Delta_{r,l}^-(a_j)$ is calculated and $D_{r,l}^-(a_j)$ is measured during a period of length) $T_l^-$.

After each trial preamble/sub-range distribution adaptation interval $T_{u,l}^+$, for all $u \in \{0, 1, \ldots, v^+ - 1\}$ and all $i \in \{0, 1, 2, \ldots, N-1\}$, the eNodeB calculates:

For the basic proposal 1 algorithm:

$$E_{u,l}^{T^+} = \sum_{i\in\{0,1,\ldots,N-1\}} \sqrt{(M_{u,l}^+(G_{i,u,l}^+) - \Phi_{u,l}^+(A_i))^2} =$$

$$\sum_{i\in\{0,1,\ldots,N-1\}} |M_{u,l}^+(G_{i,u,l}^+) - \Phi_{u,l}^+(A_i)|$$

(where $G_{i,u,l}^+$ and $M_{u,l}^-(G_{i,u,l}^+)$ are calculated, and $\Phi_{u,l}^+(A_i)$ is measured, during a period of length $T_l^+$)

For the alternative variant of the basic proposal 1 algorithm:

$$E_{u,l}^{T^+} = \sum_{i\in\{0,1,\ldots,N-1\}} \sqrt{(\Delta_{u,l}^+(A_i) - D_{u,l}^+(A_i))^2} = \sum_{i\in\{0,1,\ldots,N-1\}} |\Delta_{u,l}^+(A_i) - D_{u,l}^+(A_i)|$$

(where $\Delta_{u,l}^+(A_i)$ is calculated, and $D_{u,l}^+(A_i)$ is measured, during a period of length $T_l^+$)

For the proposal 2 algorithms:

$$E_{u,l}^{T^+} = \sum_{i\in\{0,1,\ldots,N-1\}} \sqrt{\left(\frac{1}{N} - \Phi_{u,l}^+(A_{i,u,l}^+)\right)^2} = \sum_{i\in\{0,1,\ldots,N-1\}} \left|\frac{1}{N} - \Phi_{u,l}^+(A_{i,u,l}^+)\right|$$

(where $A_{i,u,l}^+$ is calculated and $\Phi_{u,l}^+(A_{i,u,l}^+)$ is measured during a period of length $T_l^+$)

Possible alternatives for the proposal 2 algorithms:

$$E_{u,l}^{T^+} = \sum_{i\in\{0,1,\ldots,N-1\}} \sqrt{(\Delta_{u,l}^+(A_{i,u,l}^+) - D_{u,l}^+(A_{i,u,l}^+))^2} =$$

$$\sum_{i\in\{0,1,\ldots,N-1\}} |\Delta_{u,l}^+(A_{i,u,l}^+) - D_{u,l}^+(A_{i,u,l}^+)|$$

(where $A_{i,u,l}^+$ and $\Delta_{u,l}^+(A_{i,u,l}^+)$ are calculated and $D_{u,l}^+(A_{i,u,l}^+)$ is measured during a period of length $T_l^+$)

or $$E_{u,l}^{T^+} = \sum_{j\in\{0,1,\ldots,\Lambda-1\}} \sqrt{(\Delta_{u,l}^+(a_j) - D_{u,l}^+(a_j))^2} = \sum_{j\in\{0,1,\ldots,\Lambda-1\}} |\Delta_{u,l}^+(a_j) - D_{u,l}^+(a_j)|$$

(where $\Delta_{u,l}^+(a_j)$ is calculated and $D_{u,l}^+(a_j)$ is measured during a period of length $T_l^+$).

After each T adaptation interval $I_l$, before the start of the subsequent T adaptation interval $I_{l+1}$, the eNodeB calculates:

$$S_l^{E^T} = \sum_{w\in\{0,1,\ldots,v-1\}} E_{w,l}^T$$

(a measure of the performance of $T_l$)

$$S_l^{E^{T^-}} = \sum_{r\in\{0,1,\ldots,v^--1\}} E_{r,l}^{T^-}$$

(a measure of the performance of $T_l^-$)

$$S_l^{E^{T^+}} = \sum_{u\in\{0,1,\ldots,v^+-1\}} E_{u,l}^{T^+}$$

-continued (a measure of the performance of $T_l^+$)

IF $\left(S_l^{E^T} \leq S_l^{E^{T^-}} \text{ AND } S_l^{E^T} \leq S_l^{E^{T^+}}\right)$ OR $S_l^{E^{T^+}} = S_l^{E^{T^-}}$ THEN DO {

$\quad T_{l+1} = T_l;$
}

ELSE IF $S_l^{E^{T^-}} < S_l^{E^T}$ AND $S_l^{E^{T^-}} < S_l^{E^{T^+}}$ THEN DO {

$\quad T_{l+1} = (1 - \gamma)T_l = \gamma T_l^-$; !COMMENT: $0 < \gamma < 1$
}

ELSE IF $S_l^{E^{T^+}} < S_l^{E^T}$ AND $S_l^{E^{T^+}} < S_l^{E^{T^-}}$ THEN DO {

$\quad T_{l+1} = (1 - \gamma)T_l + \gamma T_l^+$; !COMMENT: $0 < \gamma < 1$
}
$I_{l+1} = v T_{l+1}$ $T_{l+1}^- = \dfrac{v}{v^-} T_{l+1}$ $T_{l+1}^+ = \dfrac{v}{v^+} T_{l+1}$ A similar adaptation of γ would be feasible. However, such an adaptation may not be worthwhile. Rather, parameter γ has a fixed value in the range 0<γ<1.

Another parameter that may be dynamically adapted is the total number of preambles P. The total number of preambles P to be distributed among the preamble groups may potentially be adapted based on the intensity or frequency with which the preambles are used, in relation to the load on the preambles being used for regular Random Access. Input data that the eNodeB may use for such adaptation include:
  Random Access intensity or frequency of using the dedicated preambles, as detected by the eNodeB.
  Random Access intensity or frequency of using the regular preambles, that is, for regular RA, as detected by the eNodeB.
  Random access back-off reports from MTC devices or UEs in a new MAC control element in Message 3 of the RA procedure. It can be clarified that back-off reports are reports on MTC devices or UEs that were not successful in the RA contention, and whose identities were not echoed at step S-346, for which reason the MTC devices or UEs will back-off, and perform another attempt later. Back-off attempts are thus reported. For instance, a first attempt 0 is reported, a second attempt 1 is reported, etc. This gives the eNodeB information about the collision rate. According to the current specifications the eNodeB may retrieve this information from a UE, without introducing a new MAC control element, by setting the rachReportReq flag to 'true' in the RRC UEInformationRequest message, which triggers the UE to include the number of preambles that the UE had to send during the last successfully completed random access procedure in the RRC UEInformationResponse message. The UE will also include an indication of whether or not the MAC layer detected contention for at least one of the transmitted preambles.

Yet another parameter that may be dynamically adapted is the Number of Preamble Groups. In addition to the preamble group merging mechanism, being a consequence of using a correspondence between RA preamble groups to the same UL allocation size, as mentioned above in relation to basic embodiments of adaptation algorithms, it is possible to have a dedicated mechanism for dynamic adaptation of the number of preamble groups.

Based on the recorded statistics on the ideal UL allocation size needs of the UEs or MTC devices in the cell together with statistics on the RA intensity using dedicated and regular preambles, the eNodeB may determine when it would be beneficial to adapt the granularity of the preamble groups.

For instance, if the allocation needs of the UEs or MTC devices are restricted to a few allocation sizes, which may be repeatedly occurring, the eNodeB may choose to reduce the number of preamble groups to match these few allocation sizes. This may occur when for instance only a few UE or MTC applications are active in the cell and these applications produce very repetitive data sizes.

On the other hand, more distributed allocation size needs together with high RA intensity using dedicated preambles could be an indication to the eNodeB to increase the number of preamble groups and thereby the granularity of the RA preamble group to uplink allocation size correspondence.

Next, preamble groups associated with Transport Formats and/or Channel Quality Conditions will be discussed. Instead of associating each preamble group with a plain UL allocation size according to UE or MTC device data, it is possible to associate each preamble group with a certain transport format, in which the amount of user data is implicit.

Since the choice of transport format to a large extent depends on the channel quality, said channel quality can also be associated with each preamble group. For an MTC device or a UE this would mean that it may choose a preamble from a certain preamble group only if the channel conditions that is experienced by the UE fulfills the channel quality condition associated with the preamble group.

Association of a channel quality condition with each preamble group is possible also if plain UL allocation sizes, without specified transport formats, are associated with the preamble groups. This feature is reminiscent of the preamble group B of the RA procedure of the state of the art 3GPP specifications.

Alternatively, if no channel conditions are associated with the preamble groups, the MTC devices or the UEs themselves may be responsible for determining whether the channel conditions are good enough for a certain preamble group.

For dynamic configuration of preamble groups, also the channel quality condition associated with each preamble group could be indicated in the System Information (SI). It can be added that the preamble group configuration may be conveyed to MTC devices or UEs in other ways. This is generic and applies irrespective of which of the above algorithms that is used for the adaptation of the mapping or correspondence between RA preamble groups and uplink resource allocation sizes.

Further, the operator may not necessarily give all RA preamble groups, and UL resource allocation sizes that they correspond or map to, equal priorities. In general, different priorities for different preamble groups may be realized as different collision probabilities for RA attempts using preambles from differently prioritized preamble groups. One reason for giving different priorities to different preamble groups may for example be that the UL resource allocation size that a certain preamble group corresponds to is frequently used by certain prioritized applications.

One way of allocating different priorities to different preamble groups is to restrict which preamble groups which may be used for certain Physical Random Access Channel (PRACH) resources. For instance, certain prioritized preamble groups may have certain dedicated PRACH resources, which may only be used with preambles from these prioritized preamble groups. In addition said certain prioritized preamble groups may have regular PRACH resources.

In order for this method to be efficient as a means of prioritization, only those UEs or MTC devices that actually need UL resource allocation sizes that correspond to the prioritized RA preamble groups should use them. That is, opportunistic use of these dedicated PRACH resources by UEs or MTC devices which actually would prefer UL allocation sizes corresponding to other, non-prioritized RA preamble groups should not be allowed or should be restricted.

Another way of allocating different priorities to different preamble groups is to maintain two or more separate sets of preamble groups, where each set would represent a different priority.

The UL allocation sizes and the RA preamble groups of the different sets they map to may cover more or less the same range and may be fully or partly overlapping. The adaptive correspondence between the RA preamble group and to UL resource allocation size may be handled separately for each set of RA preamble groups or the different sets may be handled together in a single process of adaptive mapping. The use of RA preambles from a prioritized set of RA preamble groups would be restricted to UEs or MTC devices with a certain priority or, preferably, to UEs or MTC devices whose access attempt is triggered by prioritized applications. This restriction lessens the competition among the preambles of the prioritized RA preamble groups and thus reduces the collision risk. One way to further reduce the collision risk is to utilize more preambles per preamble group or smaller Uplink resource allocation size ranges for prioritized preamble groups than for non-prioritized preamble groups.

There are several ways that UEs or MTC devices may receive instructions regarding prioritized preamble groups and the usage thereof. The instructions may pertain to dedicated PRACH resources or separate preamble group sets. The UEs or MTC devices may be preconfigured, for instance through standardization or Universal Subscriber Identity Module (USIM) data, or informed via SI or other Radio Resource Control (RRC) signaling.

Yet another way to allocate different priorities to different preamble groups is to ensure a lower collision probability for prioritized preamble groups by calculating the correspondence between groups of RA preambles and the uplink allocation sizes differently for different groups of RA preambles, such as prioritized and non-prioritized preamble groups. Instead of aiming for equal collision probability for all RA preamble groups, the process of adaptive correspondence would aim for lower collision probability for prioritized preamble groups than for non-prioritized preamble groups.

For embodiments of the algorithm proposal 1 this could mean that a prioritized preamble group would contain more preambles than it would have done if it had been a non-prioritized, or lower prioritized, preamble group. That is, instead of aiming to make the number preambles of each preamble group proportional to the number of MTC device or UE accesses using the preamble group, the adaptive correspondence algorithm would rather strive for this as an average adaptation target, while allocating more preambles than needed for this average adaptation target to prioritized preamble groups and less preambles than needed for this average adaptation target to non-prioritized preamble groups.

For embodiments of the algorithm proposal 2, a way to achieve the differentiated collision probability could mean to generally keep UL allocations size ranges smaller for prioritized preamble groups than for non-prioritized, or lower prioritized, RA preamble groups.

An alternative way to achieve the differentiated collision probability may be to first execute the adaptive correspondence algorithm as if all preamble groups had equal priority and then add a suitable number of preambles to each prioritized preamble group, preferably a greater number the greater the priority of the preamble group is. An example of this way to allocate different priorities to different preamble groups will be presented in the following by an adaptation of algorithm proposal 1. This algorithm is modified to differentiate between two different priority levels, for instance, prioritized and non-prioritized.

For this modified algorithm the following further notation is introduced:

$r(G_i)$ The priority level of preamble group $G_i$, that is either 'prioritized' or 'non-prioritized'.

R The total number of prioritized preamble groups, that is the number of preamble groups for which $r(G_i)$='prioritized'.

$\epsilon(r(G_i))$ A parameter which is used to bias the number of preambles, and thus the collision probability, of the different preamble groups in accordance with the priority level of each preamble group.

C A parameter constant that is used in the calculation of $\epsilon(r(G_i))$. It is assigned a value satisfying $$0 < C < \frac{N-R}{N}.$$

This condition ensures that the number of preambles is biased in different direction for prioritized and non-prioritized groups and that $\epsilon(r(G_i)) > -1$.

A modified basic algorithm for adaptation of $M_n(G_i)$ and $p_n(G_i)$ will now be discussed.

For all $i \in \{0, 1, 2, \ldots, N-1\}$:

```
IF G_i is prioritized THEN DO {
    r(G_i) = 'prioritized';
    ε(r(G_i)) = C N/R;
}
ELSE DO {
    r(G_i) = 'non-prioritized';
    ε(r(G_i)) = -C N/(N-R);
}
```

The eNodeB measures d for all accesses during each preamble distribution adaptation interval. After each adaptation interval $T_n$ the eNodeB calculates for all $i \in \{0, 1, 2, \ldots, N-1\}$:

$D_n(A_i)$ $$\Phi_n(A_i) = \frac{D_n(A_i)}{\sum_{j \in \{0,1,\ldots,N-1\}} D_n(A_j)}$$

$M_{n+1}(G_i) = (1-\alpha)M_n(G_i) + \alpha \Phi_n(A_i)(1+\epsilon(r(G_i)))$ (where $0 \le \alpha \le 1$)

$p_{n+1}(G_i) = \text{INT}(M_{n+1}(G_i)P + 0.5)$ (That is, $p_{n+1}(G_i)$ is rounded to the integer value closest to $M_{n+1}(G_i)P$.)

Adjustments, if needed, to make sure that $$\sum_{i \in \{0,1,\ldots,N-1\}} p_{n+1}(G_i) = P:$$

```
G = {G_i : i ∈ {0,...N - 1}};

WHILE  ∑         p_{n+1}(G_i) ≠ P DO {
       i∈{0,1,...,N-1}

IF  ∑         p_{n+1}(G_i) < P THEN DO {
        i∈{0,1,...,N-1} q = arg max  (M_{n+1}(G_i)P - p_{n+1}(G_i)) ;
            i∈{0,1,...,N-1} p_{n+1}(G_q) = p_{n+1}(G_q) + 1;
    }

ELSE IF  ∑         p_{n+1}(G_i) > P THEN DO {
             i∈{0,1,...,N-1} groupReduced = 'false';
        WHILE NOT groupReduced DO { q = arg max  (p_{n+1}(G_i) - M_{n+1}(G_i)P) ;
                i∈{0,1,...,N-1}

IF p_{n+1}(G_q) ≠ 0 THEN DO {
                p_{n+1}(G_q) = p_{n+1}(G_q) - 1;
                groupReduced = 'true';
            }
            ELSE DO
                G - {G_i}; !COMMENT: G_i is removed from G (may equally
                be expressed: G \ {G_i}).
            }
        }
    }
}
```

Next, multiple time dependent mapping between RA preamble groups and uplink resource allocation sizes will be discussed. The traffic of the UEs or MTC devices and hence the need for RA preamble group to uplink resource allocation size mapping may vary more or less regularly with time, for example according to a time of day pattern and/or a day of week pattern and possibly even a yearly pattern.

In the case a mapping, which would be considered to be an optimal RA preamble group to uplink resource allocation size mapping or correspondence, varies significantly according to one of more of these time patterns, it may be beneficial to let the mapping track and follow the pattern(s). However, the adaptive mapping process is not able to track and adapt to traffic or access characteristic variations on time scales smaller than the operation time scale of the adaptive mapping process. Instead the RA preamble group to uplink resource allocation size mapping will be adapted to some sort of average traffic/access characteristic.

To overcome this problem it would be possible to maintain several processes of adaptation of the mapping between RA preamble groups and uplink resource allocation sizes in parallel, one for each distinguished time period or combination of time periods. The purpose would be to be able to use the same adaptive mapping process for all time periods with approximately the same traffic/access characteristic, while time periods with other traffic/access characteristics would be covered by at least one other adaptive mapping process.

For instance, one possible scenario is that weekday morning and evening rush hours display one typical traffic/access characteristic, office hours excluding rush hours display another typical traffic/access characteristic, weekday evenings between evening rush hour and midnight display a third typical traffic/access characteristic, nights before weekdays (midnight to morning rush hour) display a fourth typical traffic/access characteristic, weekend and holiday daytime display a fifth typical traffic/access characteristic and nights before days of weekends and holidays display a sixth typical access/traffic characteristic.

To adapt to these daily and weekly patterns, six separate adaptation processes of RA preamble group to uplink resource allocation size mapping or correspondence may be maintained in parallel, one for each of the above distinguished time period combinations. An adaptation process associated with a certain time period combination would only consider input data from this time period combination. For instance, the adaptation process associated with the rush hours would measure access characteristics, which would be used as input to the adaptation process, only during rush hours and disregard what happens during other times.

As time passes over the different distinguished time periods or combinations of time periods, the RA preamble group to uplink resource allocation size mapping that is valid, i.e. applied, would change between the different mappings or correspondences that the different adaptation processes currently perceive as optimal, such that the mapping that is most advantageous for the current time period is always valid or applied.

To convey these changes to the UEs, the RA preamble group to uplink resource allocation size mapping information in the System Information (SI) could be changed with every change from one distinguished time period combination to another. An alternative is to let the RA preamble group to uplink resource allocation size mapping information of all separate adaptations be present in the SI at all times, with associated information about which time period combination that is associated with each separate mapping, which would incur fewer changes of the SI.

The dedicated preamble groups could also be divided into an adaptively calculated and a non-adaptively calculated subset. This will now be discussed. A network operator may want to maintain a firmer control of the mapping or correspondence between RA preamble groups and uplink resource allocation sizes of some of the preamble groups, for instance to ensure that certain uplink resource allocation sizes are always covered by suitably sized preamble groups. One reason for this may be that the operator knows that certain delay-sensitive, and thus collision-sensitive, or otherwise prioritized, applications use these message sizes, which for instance may motivate maintaining a lower collision probability for the RA preamble groups mapping or corresponding to these UL resource allocation sizes.

Therefore the dedicated preamble groups may be divided into two subsets, where one of the adaptive mapping mechanisms as described herein is applied to the preamble groups in one of the subsets, whereas the preamble groups, as well as their mappings, in the other subset are semi-permanently calculated by the operator.

It must be emphasized that the herein described embodiments are only a few examples of the variety of embodiments made possible with the present disclosure.

Although the present disclosure has been described above with reference to specific embodiments, it is not intended to be limited to the specific form set forth herein. Rather, the invention of this disclosure is limited only by the accompanying claims and other embodiments than the specific ones presented above are equally possible within the scope of these appended claims. It is also to be made clear that presented embodiments may well be combined forming new embodiments not explicitly described herein.

In the claims, the term "comprises/comprising" does not exclude the presence of other elements or steps. Furthermore, although individually listed, a plurality of means or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way. Embodiments of the present disclosure provide the following advantages:

Embodiments of the present invention provide UEs or Machine Type Communication (MTC) devices with an efficient means to signal their UL allocation needs for transmission of user data in conjunction with step 3 of the Random Access procedure.

Embodiments provide UEs or MTC devices with an appropriate UL allocation resource for Random Access step 3, thereby being able to transmit queued data, while retaining good radio resource utilization, which means that resources are well utilized.

Another advantage is that an increased UL resource allocation size granularity is provided.

Also, less battery power is consumed in UEs or MTC devices according to embodiments of the present disclosure.

It is also advantageous that less radio resources are used in a cell with UE and MTC devices according to embodiments of the present disclosure.

It is an advantage that means for signaling of UL data size needs, by using the RA preamble group to UL resource allocation size mapping, is adaptively configured.

The embodiments of the present invention are advantageous in that the Random Access preamble collision risk is either reduced or maintained, that is at least not increased.

A further advantage is that system efficiency can be maintained high due to ability to adapt to changing conditions.

The invention claimed is:

1. A method in a base station for adapting random access resource allocating to user equipments (UEs) of a cell served by said base station, the method comprising:
    receiving, from a user equipment (UE), a random access (RA) request comprising a RA preamble selected by the UE from a group of RA preambles associated with a RA resource allocation size, said UE requesting uplink (UL) radio resources;
    determining availability of UL radio resources based on requested radio resources in the cell and based on the selected RA preamble of said RA request;
    responding to the UE with a RA resource allocation dependent on said RA request and dependent on the determined availability of UL radio resources;
    receiving, from the UE, a RA message comprising UE data sent on the RA radio resource allocation;
    monitoring radio resource usage in the cell; and
    adapting, based on the monitored radio resource usage, a mapping between groups of RA preambles and RA resource allocation sizes configured for said cell.

2. The method of claim 1, wherein the adapted mapping between groups of RA preambles and RA resource allocation sizes is applied for subsequent RA requests from UEs in the cell wanting UL RA radio resources.

3. The method of claim 1, wherein one or more parameter values of said mapping of groups of RA preambles to RA resource allocation sizes are configured for said cell, and wherein the adapting of the mapping comprises changing at least one of said one or more mapping parameter values.

4. The method of claim 3, wherein the one or more mapping parameter values comprise one or more of: a number of groups of RA preambles defined for said cell, a number of RA preambles defined for each RA preamble group of said number of groups, a priority level defined for each RA preamble group of said number of RA preamble groups and a defined size of a RA resource allocation associated with each RA preamble group of said number of RA preamble groups.

5. The method of claim 1, wherein said mapping is adapted by one or more of:
    changing the RA resource allocation size that at least one of said RA preamble groups is associated with; and
    changing the number of RA preambles that is associated with at least one of said groups of RA preambles, and
    changing the priority level of at least one RA preamble group of said number of RA preamble groups.

6. The method of claim 1, wherein the adapted mapping for one or more RA preamble groups is applied for a set time period, and wherein a subsequent adapting of a mapping for said one or more RA preamble groups is applied after the expiry of said time period.

7. The method of claim 1, wherein a mapping adaptation procedure for one or more RA preamble groups is performed during a set time period, and wherein a subsequent mapping adaptation procedure for said one or more RA preamble groups is performed after the expiry of said time period.

8. The method of claim 1, wherein the monitoring of radio resource usage in the cell comprises monitoring one or more of:
    a frequency of usage of one or more RA preamble groups,
    an amount of uplink UE data received in RA messages, and
    an amount of UE data waiting to be transmitted uplink by one or more UEs.

9. The method of claim 8, wherein the amount of uplink UE data waiting to be transmitted by one or more UEs in the cell is indicated in a Buffer Status Report (BSR) received from each one of said one or more UEs.

10. The method of claim 1, wherein the adapting of a mapping comprises calculating the adapted mapping between said groups of RA preambles and resource allocation sizes such that at least one group of RA preambles have higher probability for collision than at least one other group of RA preambles of said groups of RA preambles in said cell, wherein a collision comprises that two UEs attempt to transmit the same RA preamble on the same random access resource.

11. The method of claim 1, further comprising informing the UEs of the cell of said adapted mapping between groups of RA preambles and RA resource allocation sizes by broadcasting the information about the adapted mapping in a system information (SI) message to the UEs of the cell.

12. The method of claim 1, further comprising adapting a random access configuration of said base station in accordance with said adapted mapping between the groups of RA preambles and RA resource allocation sizes.

13. A method in a User Equipment (UE) for requesting a Random Access (RA) resource allocation for uplink data, the UE being comprised in a cell served by a base station, the method comprising:

receiving information of a mapping between groups of RA preambles and RA resource allocation sizes from the base station;

adapting a random access configuration of said UE in accordance with said received information of the mapping between the groups of RA preambles and RA resource allocation sizes;

estimating a required RA resource allocation size, based on an amount of data to be transmitted uplink by the UE;

determining a RA preamble group associated with a RA resource allocation size, where said RA resource allocation size is equal to or exceeds the estimated required resource allocation size by a margin, based on said received mapping information; and selecting a RA preamble from the determined RA preamble group to be sent in a RA request to said base station, said RA preamble indicating a required amount of RA resources to be allocated to said UE for transmitting said amount of UL data.

14. The method of claim 13, wherein the RA resource allocation size exceeds the estimated required resource allocation size by the smallest margin of the resource allocation sizes associated with any of the preamble groups.

15. The method of claim 13, further comprising sending the selected RA preamble to the base station in a RA request, whereby an uplink radio resource allocation of said resource allocation size is requested for transmitting said amount of data uplink.

16. A base station for adapting random access resource allocations to user equipments (UEs) comprised in a cell served by said base station, the base station comprising transceiver circuitry configured to receive, from a user equipment (UE), a random access (RA) request comprising a RA preamble selected by the UE from a group of RA preambles associated with a RA resource allocation size, said UE requesting uplink (UL) radio resources; and processor circuitry connected to said transceiver circuitry; wherein said processor and transceiver circuitry are configured to:

determine availability of UL radio resources based on requested resources in the cell and based on the selected RA preamble of said RA request;

respond to the UE with an UL RA resource allocation dependent on said RA request and dependent on the determined availability of UL radio resources;

receive, from the UE, a RA message comprising UE data sent on the UL RA resource allocation;

monitor radio resource usage in the cell, and adapt, based on the monitored radio resource usage, a mapping between groups of RA preambles and RA resource allocation sizes configured for said cell.

17. The base station of claim 16, wherein said transceiver circuitry is further configured to inform the UEs of the cell of said adapted mapping by broadcasting information of the adapted mapping in a system information (SI) message.

18. The base station of claim 16, further comprising a memory connected to said processor circuitry and configured to store one or more parameter values of said mapping between groups of RA preambles and RA resource allocation sizes defined for said cell, and wherein the processor circuitry is further configured to adapt the mapping by changing at least one of said stored one or more mapping parameter values.

19. The base station of claim 18, wherein the one or more mapping parameter values comprises one or more of: a number of groups of RA preambles defined for said cell, a number of RA preambles defined for each RA preamble group of said number of groups, a priority level defined for each RA preamble group of said number of RA preamble groups and a defined size of a RA resource allocation associated with each RA preamble group of said number of RA preamble groups.

20. The base station of claim 16, wherein said processor circuitry is further configured to adapt the mapping by one or more of:

changing the RA resource allocation size that at least one of said RA preamble groups is associated with;

changing the number of RA preambles that is associated with at least one of said groups of RA preambles, and changing the priority level of at least one RA preamble group of said number of RA preamble groups.

21. The base station of claim 16, wherein said processor circuitry is further configured to apply the adapted mapping for one or more RA preamble groups for a set time period, and is further configured to perform a subsequent adapting of a mapping for said one or more RA preamble groups after the expiry of said time period.

22. The base station of claim 16, wherein said processor circuitry is further configured to control the monitoring of radio resource usage in the cell by controlling the monitoring of one or more of:

a frequency of usage of one or more RA preamble groups, an amount of uplink UE data received in RA messages, and an amount of UE data waiting to be transmitted uplink by one or more UEs, wherein the amount of uplink UE data waiting to be transmitted by one or more UEs in the cell is indicated in a Buffer Status Report (BSR) received from each one of said one or more UEs.

23. A User Equipment (UE) configured for requesting a Random Access (RA) resource allocation for uplink data in a cell served by a base station, the UE comprising:

a transceiver configured to receive information of a mapping between groups of RA preambles and RA resource allocation sizes from the base station, and a processor operatively connected to said transceiver, wherein said processor is configured to:

adapt a random access configuration of said UE in accordance with said received information of the mapping between the groups of RA preambles and RA resource allocation sizes, estimate a required RA resource allocation size, based on an amount of data to be transmitted uplink by the UE, determine a RA preamble group associated with a RA resource allocation size, where said RA resource allocation size is equal to or exceeds the estimated required resource allocation size by a margin, based on said received mapping information, and said processor being further configured to select a RA preamble from the determined RA preamble group to be sent as a RA request to said base station said RA preamble indicating a required amount of RA resources to be allocated to said UE for transmitting said amount of UL data.

24. The UE of claim 23, wherein the RA resource allocation size exceeds the estimated required resource allocation size by the smallest margin of the resource allocation sizes associated with any of the preamble groups.

25. The UE of claim 23, wherein the UE is a Machine Type Communication (MTC) device.

26. The UE of claim 23, wherein the processor is configured to adapt the random access configuration of said UE by changing random access configuration parameter values relating to one or more of:

a number of groups of RA preambles defined for use in said cell,
a number of RA preambles defined for each RA preamble group of said number of groups RA preambles,
a priority level defined for each respective RA preamble group of said number of RA preamble groups, and
a defined size of a RA resource allocation associated with each respective RA preamble group of said number of RA preamble groups.

* * * * *